United States Patent
Kohler et al.

(10) Patent No.: US 12,448,064 B2
(45) Date of Patent: Oct. 21, 2025

(54) TRACKED ALL-TERRAIN VEHICLE

(71) Applicant: Polaris Industries Inc., Medina, MN (US)

(72) Inventors: Beat R. Kohler, Kirchberg (CH); Eric J. Borud, Roseau, MN (US)

(73) Assignee: POLARIS INDUSTRIES INC., Medina, MN (US)

( * ) Notice: Subject to any disclaimer, the term of this patent is extended or adjusted under 35 U.S.C. 154(b) by 0 days.

(21) Appl. No.: 17/372,387

(22) Filed: Jul. 9, 2021

(65) Prior Publication Data

US 2021/0331752 A1    Oct. 28, 2021

Related U.S. Application Data

(63) Continuation of application No. 14/225,206, filed on Mar. 25, 2014, now abandoned.
(Continued)

(51) Int. Cl.
| | |
|---|---|
| *B62D 55/06* | (2006.01) |
| *B62D 11/18* | (2006.01) |
| *B62D 21/18* | (2006.01) |
| *B62D 55/10* | (2006.01) |
| *B62D 55/112* | (2006.01) |

(Continued)

(52) U.S. Cl.
CPC .............. *B62D 55/06* (2013.01); *B62D 11/18* (2013.01); *B62D 21/186* (2013.01); *B62D 55/10* (2013.01); *B62D 55/112* (2013.01); *B62D 55/244* (2013.01); *G06F 11/30* (2013.01); *B60G 2300/32* (2013.01)

(58) Field of Classification Search
CPC ...... B62D 55/06; B62D 55/10; B62D 55/112; B62D 55/244; B62D 11/04; B62D 55/125; B62D 55/13; B62D 55/075; B60K 2001/0438; B60K 1/04; B60K 1/0405
USPC ................................. 180/6.5, 6.7
See application file for complete search history.

(56) References Cited

U.S. PATENT DOCUMENTS

| | | | |
|---|---|---|---|
| 1,317,103 A * | 9/1919 | Rimailho ............. | B62D 55/125 180/9.62 |
| 1,368,652 A | 2/1921 | Pennington et al. | |

(Continued)

FOREIGN PATENT DOCUMENTS

| | | |
|---|---|---|
| CA | 2737173 A1 | 10/2012 |
| CN | 1861436 A | 11/2006 |

(Continued)

OTHER PUBLICATIONS

A Highly Mobile Amphibious Vehicle Capable of Floating Above Water in Preparation for Flood Damage, Japan, Oct. 20, 2015, https://scan.netsecurity.ne.jp/article/2015/10/20/37538.html; 7 pages.
(Continued)

*Primary Examiner* — Anne Marie M Boehler
(74) *Attorney, Agent, or Firm* — SCHWEGMAN LUNDBERG & WOESSNER, P.A.

(57) ABSTRACT

A tracked ATV includes a frame, a track coupled to the frame, and a power source supported by the frame and drivingly coupled to the track. The tracked ATV further includes a steering and drive assembly, which has a first hydraulic pump coupled to the tracks for large radius turns. The steering and drive assembly also has a second hydraulic pump coupled to the tracks for small radius turns.

24 Claims, 30 Drawing Sheets

Related U.S. Application Data

(60) Provisional application No. 61/805,113, filed on Mar. 25, 2013.

(51) Int. Cl.
    *B62D 55/125*     (2006.01)
    *B62D 55/24*     (2006.01)
    *G06F 11/30*     (2006.01)

(56) References Cited

U.S. PATENT DOCUMENTS

| | | | |
|---|---|---|---|
| 2,779,636 A | 1/1957 | Allen | |
| 2,967,075 A | 1/1961 | Christie | |
| 3,068,950 A * | 12/1962 | Davidson | B62D 55/075 180/6.7 |
| 3,262,522 A | 7/1966 | Johnson et al. | |
| 3,288,237 A | 11/1966 | Muller | |
| 3,311,424 A | 3/1967 | Taylor | |
| 3,371,734 A | 3/1968 | Xaver et al. | |
| 3,374,005 A | 3/1968 | Donlon et al. | |
| 3,446,303 A | 5/1969 | Trapp | |
| 3,602,470 A * | 8/1971 | Reynolds | B62D 55/1125 180/9.1 |
| 3,698,500 A | 10/1972 | Jernigan | |
| 4,102,292 A * | 7/1978 | Hunter | B60F 3/0007 440/12.63 |
| 4,458,955 A | 7/1984 | Webb | |
| 4,502,736 A * | 3/1985 | Johnson | B62D 55/06 305/137 |
| 4,544,170 A | 10/1985 | Ebert et al. | |
| 5,273,126 A | 12/1993 | Reed et al. | |
| 5,363,937 A * | 11/1994 | James | B60L 7/24 180/6.28 |
| 5,409,075 A | 4/1995 | Nieman | |
| 5,503,238 A | 4/1996 | Urbanek et al. | |
| 5,691,806 A | 11/1997 | Tokuda et al. | |
| 5,692,579 A | 12/1997 | Peppel et al. | |
| 5,944,134 A | 8/1999 | Peppel et al. | |
| 5,960,901 A * | 10/1999 | Hanagan | B60L 3/0046 296/187.02 |
| 5,988,775 A * | 11/1999 | Nordberg | B62D 55/305 305/153 |
| 6,009,966 A | 1/2000 | Olson et al. | |
| 6,125,958 A | 10/2000 | Olson et al. | |
| 6,311,798 B1 | 11/2001 | Anderson | |
| 6,328,124 B1 | 12/2001 | Olson et al. | |
| 6,343,666 B1 | 2/2002 | Olson et al. | |
| 6,419,036 B1 * | 7/2002 | Miglia | B62D 55/06 180/9.1 |
| 6,431,561 B1 | 8/2002 | Hedlund | |
| RE38,124 E | 5/2003 | Mallette et al. | |
| 6,604,590 B2 * | 8/2003 | Foulk, Jr. | A61G 5/066 180/908 |
| 6,615,885 B1 | 9/2003 | Ohm | |
| 6,692,222 B2 | 2/2004 | Prinz et al. | |
| 6,942,050 B1 | 9/2005 | Honkala et al. | |
| 6,955,237 B1 | 10/2005 | Przekwas et al. | |
| 6,962,222 B2 | 11/2005 | Kirihata | |
| 7,080,704 B1 | 7/2006 | Kerner et al. | |
| 7,089,917 B1 | 8/2006 | McKinster et al. | |
| 7,128,176 B1 | 10/2006 | Mills et al. | |
| 7,131,507 B2 | 11/2006 | Wenger | |
| 7,147,074 B1 | 12/2006 | Berg et al. | |
| 7,328,943 B2 | 2/2008 | Johnson et al. | |
| 7,360,613 B2 | 4/2008 | Hasegawa et al. | |
| 7,401,674 B1 | 7/2008 | Berg et al. | |
| 7,410,022 B1 | 8/2008 | Berg et al. | |
| 7,644,788 B2 | 1/2010 | Scheetz | |
| 7,739,005 B1 | 6/2010 | Tang | |
| 7,848,584 B2 | 12/2010 | Monro | |
| 7,854,285 B1 | 12/2010 | Giese | |
| 7,918,299 B2 | 4/2011 | Yoshihara | |
| 7,967,087 B2 | 6/2011 | Arulraja et al. | |
| 8,100,205 B2 | 1/2012 | Gettings et al. | |
| 8,147,007 B2 | 4/2012 | Rainer | |
| 8,151,923 B1 | 4/2012 | Giese | |
| 8,479,860 B1 | 7/2013 | Jorgenson | |
| 8,499,877 B1 | 8/2013 | Giese | |
| 8,567,546 B2 | 10/2013 | Berg et al. | |
| 8,708,069 B2 | 4/2014 | Allaire | |
| 8,733,773 B2 | 5/2014 | Sampson | |
| 8,820,458 B2 | 9/2014 | Giese | |
| 8,844,665 B2 | 9/2014 | Wenger et al. | |
| 8,919,477 B2 | 12/2014 | Conn et al. | |
| 8,936,122 B2 | 1/2015 | MacGregor et al. | |
| 8,944,204 B2 | 2/2015 | Ripley et al. | |
| 8,978,794 B2 | 3/2015 | Giese et al. | |
| 8,991,528 B2 | 3/2015 | Hellholm et al. | |
| 9,096,133 B2 | 8/2015 | Kohler | |
| 9,096,289 B2 | 8/2015 | Hedlund et al. | |
| 9,139,255 B1 | 9/2015 | Glissmeyer et al. | |
| 9,248,886 B1 | 2/2016 | Giese | |
| 9,352,802 B2 | 5/2016 | Sampson | |
| 9,428,232 B2 | 8/2016 | Ripley et al. | |
| 9,540,072 B2 | 1/2017 | Hedlund et al. | |
| 9,878,748 B2 * | 1/2018 | Hellholm | B62D 55/084 |
| 2001/0007292 A1 | 7/2001 | Yabf | |
| 2002/0104491 A1 | 8/2002 | Izumi | |
| 2003/0015356 A1 | 1/2003 | Wolfgang et al. | |
| 2004/0204803 A1 | 10/2004 | Matsuda et al. | |
| 2005/0019173 A1 | 1/2005 | Wakitani et al. | |
| 2006/0157290 A1 | 7/2006 | Wenger et al. | |
| 2006/0237239 A1 * | 10/2006 | Bruner | B62D 55/12 180/9.1 |
| 2006/0249316 A1 | 11/2006 | Buller | |
| 2008/0103011 A1 | 5/2008 | Gleasman et al. | |
| 2008/0142235 A1 | 6/2008 | Jacobsson | |
| 2009/0166101 A1 | 7/2009 | Wenger et al. | |
| 2010/0089668 A1 * | 4/2010 | Kisse | E02F 9/02 180/9.1 |
| 2010/0276990 A1 | 11/2010 | Zuchoski et al. | |
| 2011/0214931 A1 | 9/2011 | Nakashima | |
| 2011/0240382 A1 | 10/2011 | Gettings et al. | |
| 2011/0301824 A1 | 12/2011 | Nelson et al. | |
| 2012/0073527 A1 | 3/2012 | Oltmans et al. | |
| 2012/0255799 A1 | 10/2012 | Kohler et al. | |
| 2012/0285757 A1 * | 11/2012 | Atarashi | B60K 11/04 903/903 |
| 2013/0033070 A1 | 2/2013 | Kinsman et al. | |
| 2013/0048392 A1 * | 2/2013 | Arcouette | B62D 55/244 180/9.1 |
| 2013/0048396 A1 | 2/2013 | Neilson | |
| 2013/0081887 A1 | 4/2013 | Tsuchihashi et al. | |
| 2013/0096790 A1 | 4/2013 | Nelson | |
| 2013/0313030 A1 * | 11/2013 | Matsumura | B60L 50/64 180/68.5 |
| 2014/0102293 A1 | 4/2014 | Miller et al. | |
| 2014/0151143 A1 | 6/2014 | Nakashima et al. | |
| 2014/0288763 A1 | 9/2014 | Bennett et al. | |
| 2015/0166132 A1 * | 6/2015 | Hellholm | B60L 50/40 180/9.1 |
| 2015/0166133 A1 | 6/2015 | Eavenson et al. | |
| 2018/0319275 A1 * | 11/2018 | Petrenec | B60K 17/342 |
| 2022/0059894 A1 * | 2/2022 | Stephens | B60L 50/66 |
| 2024/0068431 A1 | 2/2024 | Mack | |

FOREIGN PATENT DOCUMENTS

| | | |
|---|---|---|
| CN | 1308163 C | 4/2007 |
| CN | 101168369 A | 4/2008 |
| CN | 103930308 A | 7/2014 |
| CN | 105050886 A | 11/2015 |
| DE | 1174182 B | 7/1964 |
| DE | 2757966 | 6/1979 |
| DE | 19537945 A1 | 4/1997 |
| DE | 19631012 A1 | 2/1998 |
| DE | 102004050436 A1 | 4/2006 |
| EP | 0734897 | 10/1996 |
| EP | 2565068 A1 | 3/2013 |
| EP | 2578755 | 4/2013 |
| EP | 2735711 | 5/2014 |
| EP | 2746087 | 6/2014 |

(56) References Cited

FOREIGN PATENT DOCUMENTS

| | | |
|---|---|---|
| EP | 3315341 | 5/2018 |
| GB | 0978037 A | 12/1964 |
| GB | 2390837 | 11/2006 |
| JP | 02-286470 A | 11/1990 |
| JP | 05-085428 A | 4/1993 |
| JP | 07-336809 A | 12/1995 |
| JP | 08-021240 A | 1/1996 |
| JP | 11-150812 A | 6/1999 |
| JP | 2003-191758 A | 7/2003 |
| JP | 2005-264870 A | 9/2005 |
| JP | 2005-287234 A | 10/2005 |
| JP | 2006-224820 A | 8/2006 |
| JP | 2007182137 | 7/2007 |
| JP | 2012-171363 A | 9/2012 |
| KR | 2003-0083301 | 10/2003 |
| KR | 10-0830551 | 5/2008 |
| KR | 2012-0085618 | 8/2012 |
| KR | 10-2016-0056153 A | 5/2016 |
| WO | 2006/046906 A1 | 5/2006 |
| WO | 2006/074559 A1 | 7/2006 |
| WO | 2009/082828 A2 | 7/2009 |
| WO | 2014/160728 A2 | 10/2014 |

OTHER PUBLICATIONS

Communication pursuant to Article 94(3) issued by the European Patent Office, dated Nov. 16, 2020, for European Patent Application No. 17758321; 6 pages.
Corrected European Search Opinion issued by the European Patent Office, dated Jun. 2, 2017, for related European Patent Application No. 16186696.7; 4 pages.
English translation of Search Report issued by the Taiwanese Intellectual Property Office, dated Jul. 2, 2019, for Taiwan Patent Application No. 106126511; 2 pages.
European Search Report issued by the European Patent Office, dated Mar. 17, 2017, for related European Patent Application No. 16186696.7; 5 pages.
Examination Report issued by the Intellectual Property India, dated Jul. 25, 2019, for Indian Patent Application No. 8191/DELNP/2015; 7 pages.
Examination Report issued by the New Zealand Intellectual Property Office dated Oct. 20, 2017 for related New Zealand Patent Applciation No. 712787; 5 pages.
Examination Report No. 1 issued by the Australian Government IP Australia, dated Jun. 17, 2019, for Australian Patent Application No. 2017281442; 5 pages.
Examination Report No. 1 issued by the Australian Government IP Australia, dated Oct. 1, 2019, for Australian Patent Application No. 2017308843; 4 pages.
Examination Report No. 1 issued by the Australian Intellectual Property Office, dated Jun. 5, 2018, for Australian Patent Application No. 2017204451; 3 pages.
First Examination Report issued by the New Zealand Intellectual Property Office, dated Aug. 11, 2017, for New Zealand Patent Application No. 712787; 5 pages.
Further Examination Report issued by the New Zealand Intellectual Property Office, dated Apr. 19, 2018, for New Zealand Patent Application No. 712787; 3 pages.
Further Examination Report issued by the New Zealand Intellectual Property Office, dated Jan. 12, 2018, for New Zealand Patent Application No. 712787; 4 pages.
Further Examination Report issued by the New Zealand Intellectual Property Office, dated Mar. 8, 2018, for New Zealand Patent Application No. 712787; 3 pages.
Further Examination Report, issued by the New Zealand Intellectual Property Office, dated Aug. 2, 2018, for New Zealand Patent Application No. 712787; 3 pages.
Further Examination Report, issued by the New Zealand Intellectual Property Office, dated Jul. 25, 2018, for New Zealand Patent Application No. 712787; 2 pages.
International Preliminary Report on Patentability received for PCT Patent Application No. PCT/US2014/031765, mailed on Jun. 25, 2015, 22 pages.
International Search Report and Written Opinion received for PCT Patent Application No. PCT/US2014/031765, mailed on Oct. 9, 2014, 17 pages.
Office Action issued by the Canadian Intellectual Property Office, dated Dec. 8, 2020, for Canadian Patent Application No. 3,028,152; 3 pages.
Office Action issued by the Canadian Intellectual Property Office, dated Dec. 7, 2018, for Canadian Patent Application No. 2,904,872; 4 pages.
Office Action issued by the Israeli Patent Office, dated Nov. 25, 2020, for Israeli Patent Application No. 241187; 3 pages.
PCT Written Opinion of the International Preliminary Examining Authority for PCT/US2014/031765 issued Apr. 9, 2015, 11 pgs.
Prospector II Track System, available at https://www.powersportsnetwork.com/enthusiasts/catalog_item_detail.asp?catalog=3567&levelcode=33367&product=431802&cattype=&ProductCategoryCode=, available as early as Dec. 31, 2008; 1 page.
Taiwan Intellectual Property Office, English Translation Search Report for Taiwan Patent Application No. 106126511, Aug. 30, 2018; 2 pages.
Examination No. 1 issued by the IP Australia, dated Oct. 23, 2023, for Australian Patent Application No. 2022231658; 7 pages.
Examination Report No. 2 issued by the Australian Patent Office, dated Feb. 21, 2024 for Australian Patent Application No. 2022231658; 5 pages.
Extended European Search Report issued by the European Patent Office, dated Jun. 19, 2024, for European Patent Application No. 24159791.3; 9 pages.

* cited by examiner

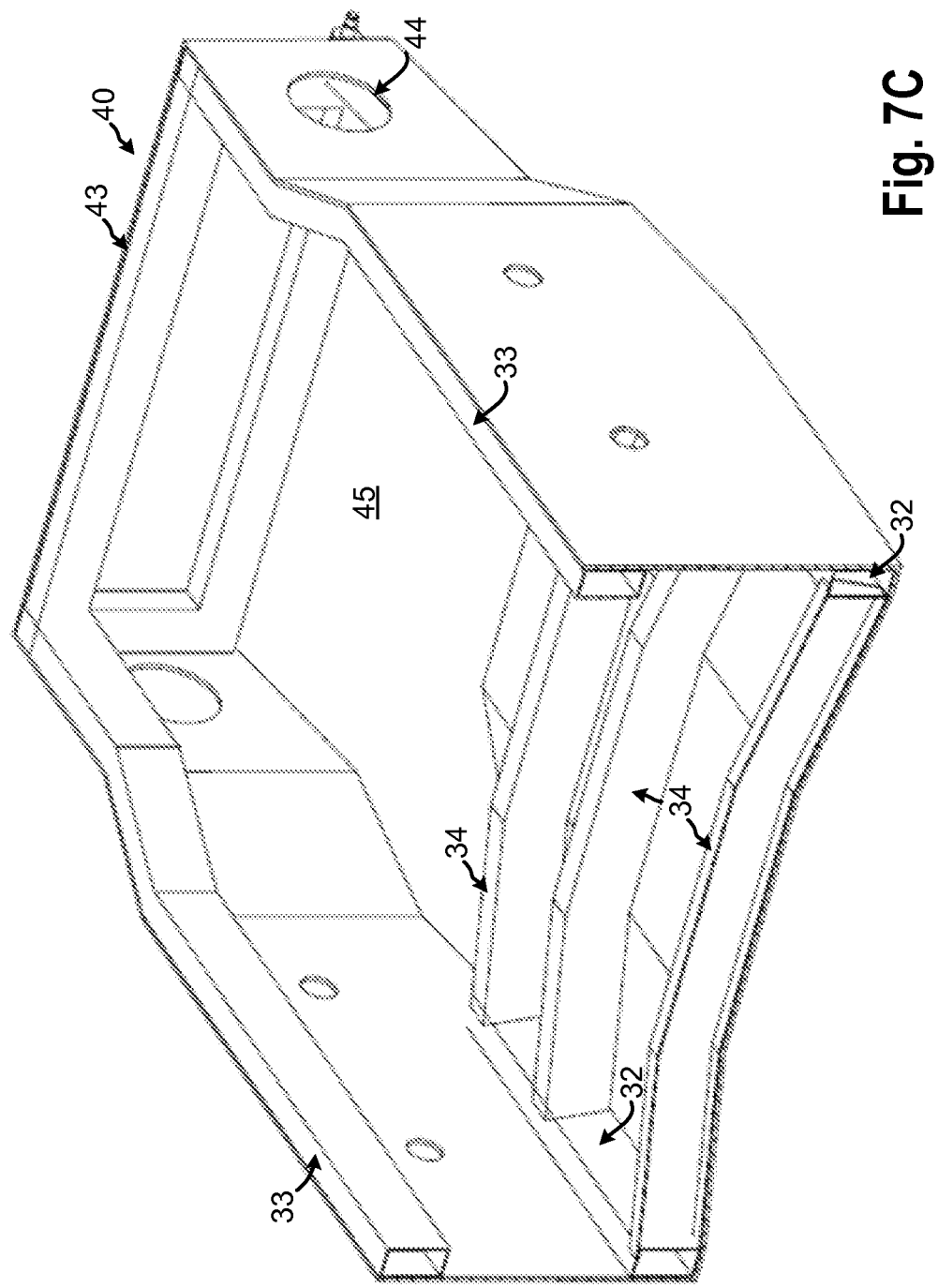

TRACKED ALL-TERRAIN VEHICLE

CROSS-REFERENCE TO RELATED APPLICATIONS

The present application is a continuation of U.S. application Ser. No. 14/225,206, filed on Mar. 25, 2014, which claims priority to U.S. Provisional Application No. 61/805,113, filed on Mar. 25, 2013, the entire disclosures of which are expressly incorporated by reference herein.

BACKGROUND OF THE DISCLOSURE

The present disclosure relates to vehicles, and more particularly to utility and all-terrain vehicles.

Generally, all-terrain vehicles ("ATVs") and utility vehicles ("UVs") are used to carry one or more passengers over a variety of terrain. More particularly, some ATVs and UVs may include side-by-side seating, in which a passenger may be seated next to the driver at the front of the vehicle. Side-by-side vehicles also may include a rear seating area to accommodate additional passengers in the vehicle. A roll cage may be provided over the seating of the vehicle. Additionally, ATVs and UVs may provide a cargo area in the front and/or the rear of the vehicle in order to carry cargo. ATVs and UVs include ground-engaging members, which may be tires, tracks, skis, or any other device for moving the vehicle across the ground.

SUMMARY OF THE DISCLOSURE

Some embodiments of the present disclosure includes a tracked ATV comprising a frame, a track coupled to the frame, and a power source supported by the frame and drivingly coupled to the track. The tracked ATV further comprises a steering and drive assembly, which has a first hydraulic pump coupled to the tracks for large radius turns. The steering and drive assembly also has a second hydraulic pump coupled to the tracks for small radius turns.

A further embodiment of the present disclosure includes a tracked ATV comprising a frame and a track coupled to the frame. The tracked ATV further comprises a power source supported by the frame and drivingly coupled to the track. The tracked ATV also comprises a steering and drive assembly, which includes a drive gear assembly coupled to the track for driving the track and a steering gear assembly. The steering gear assembly includes a first hydraulic pump and a motor. The first hydraulic pump is driven by the drive gear assembly when the vehicle is moving.

Another embodiment of the present disclosure includes a tracked ATV comprising a frame, a track coupled to the frame, and a power source supported by the frame and drivingly coupled to the track. The tracked ATV further comprises a suspension system coupled to the frame and supporting the track. The suspension system comprises a plurality of control arms coupled at an upper end to the frame and at a lower end to a carrier roller. At least some of the carrier rollers move independently of the other carrier rollers.

According to another illustrative embodiment of the present disclosure, a tracked ATV is provided including a frame, a track coupled to the frame, and a power source supported by the frame and drivingly coupled to the track. The tracked ATV further includes a plurality of load sensors supported by the frame, and each load sensor is operative to detect a load on the frame. The tracked ATV further includes a display device operative to display an indication of payload distribution of the vehicle. The tracked ATV further includes a control unit in communication with the plurality of load sensors and the display device. The control unit is operative to calculate a payload distribution of the vehicle based on output from the plurality of load sensors and to determine a recommended payload adjustment based on the calculated payload distribution. The control unit is operative to transmit a signal to the display device representative of the recommend payload adjustment.

According to yet another illustrative embodiment of the present disclosure, a method of managing payload distribution of a tracked all-terrain vehicle (ATV) is provided. The method includes providing a tracked ATV including a frame, a track coupled to the frame, and a power source supported by the frame and drivingly coupled to the track. The method includes detecting, by a plurality of load sensors, at least one load on the frame. The method includes calculating, by a control unit, a payload distribution of the vehicle based on output from the plurality of load sensors. The method includes determining, by the control unit, a recommended payload adjustment based on the calculated payload distribution. The method further includes transmitting, by the control unit, a signal to a display device representative of the recommend payload adjustment.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The foregoing aspects and many of the intended advantages of this invention will become more readily appreciated as the same becomes better understood by reference to the following detailed description when taken in conjunction with the accompanying drawings.

FIG. 7C is a rear cross-sectional view of a front portion of the frame assembly and the tub of FIG. 7A;

Figure 1:
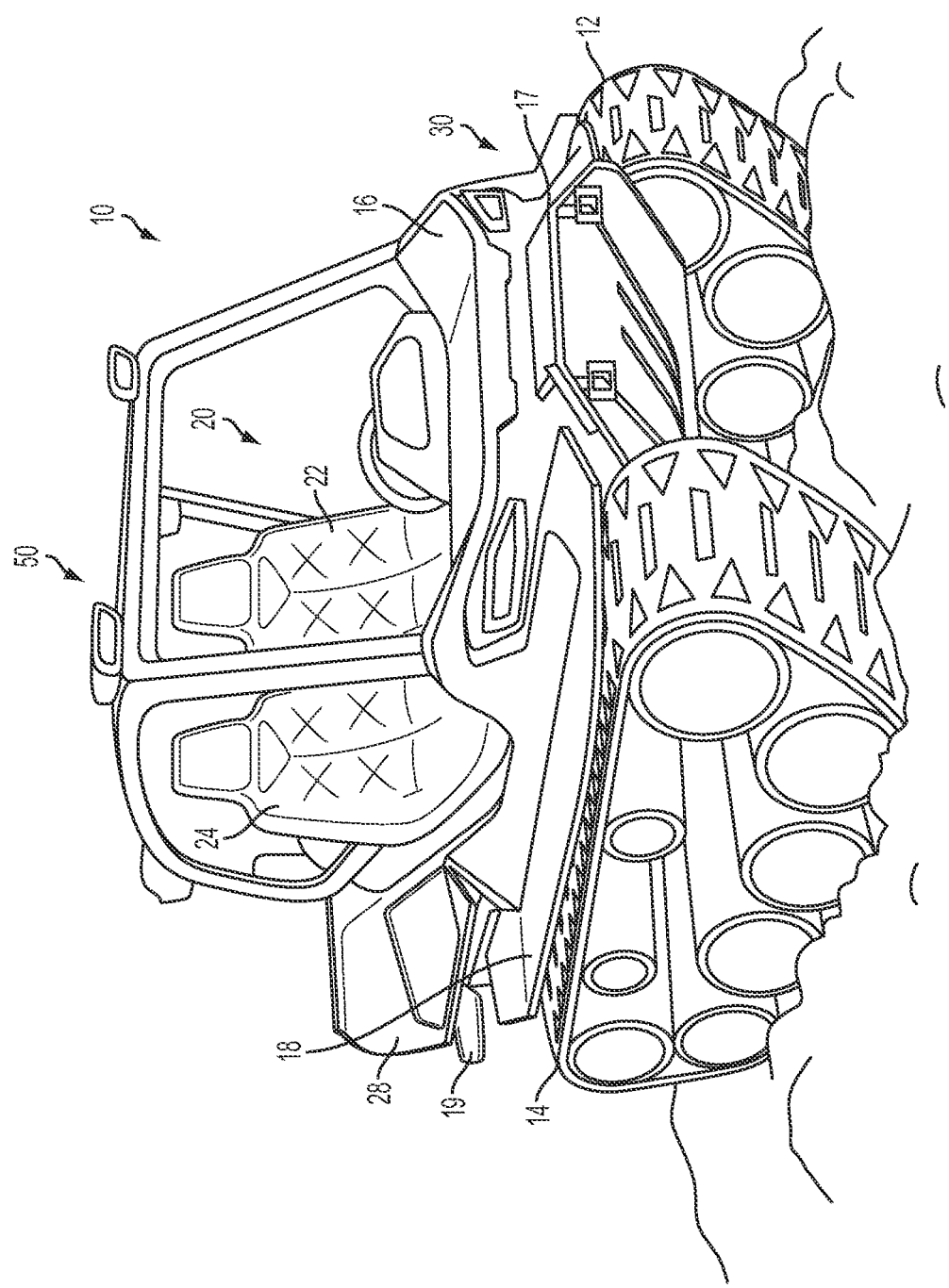
FIG. 1 is a right front perspective view of an illustrative vehicle of the present disclosure.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplifications set out herein illustrate embodiments of the invention, and such exemplifications are not to be construed as limiting the scope of the invention in any manner.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to other types of vehicles such as all-terrain vehicles ("ATV"), utility vehicles ("UV"), motorcycles, watercraft, snowmobiles, side-by-side vehicle ("SxS"), and golf carts.

Figure 4:
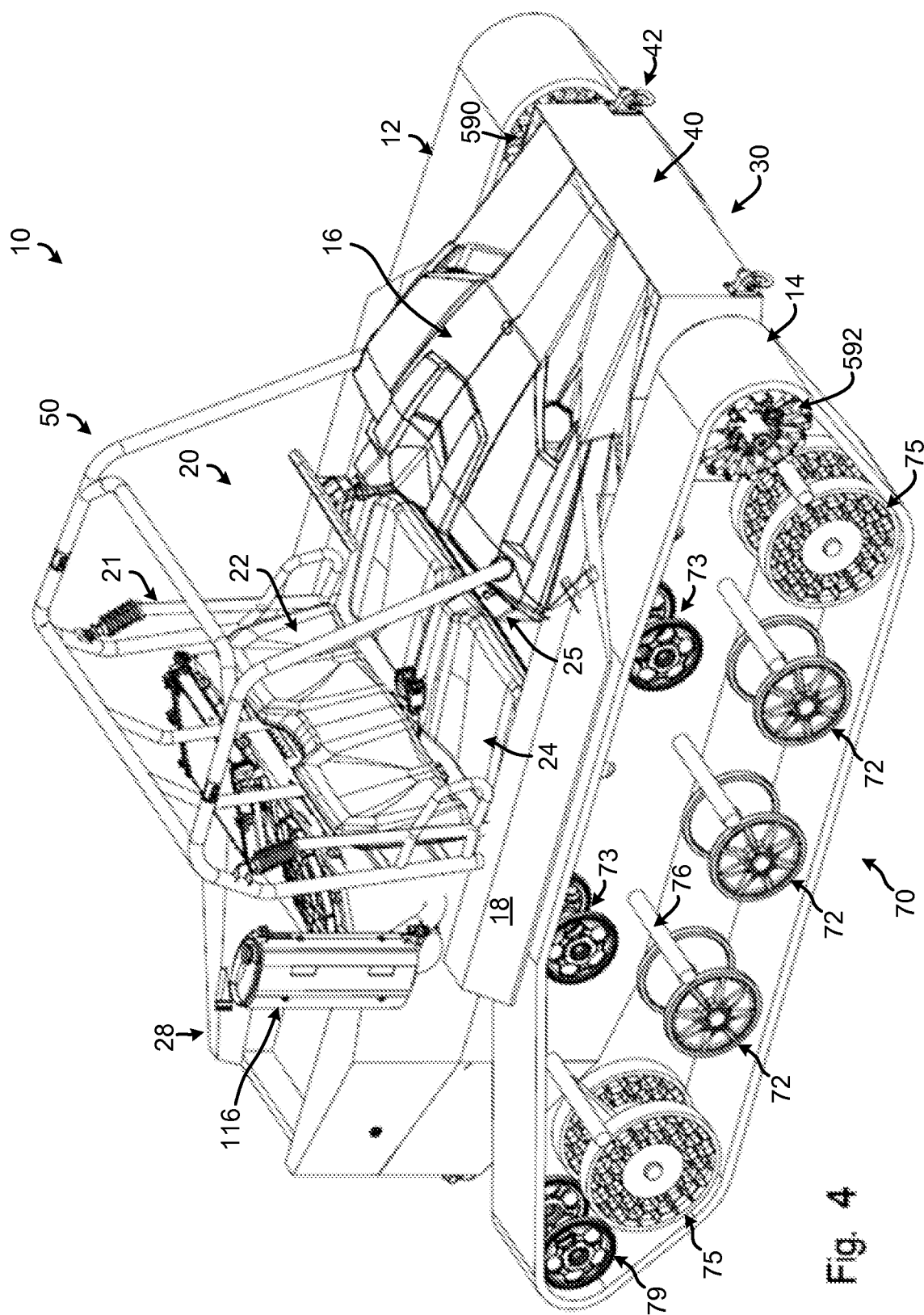
FIG. 4 is a right front perspective view of the vehicle of the present disclosure.

Referring to FIG. 1, an illustrative embodiment of a vehicle 10 is shown. As detailed further herein, vehicle 10 may be a tracked ATV that includes ground engaging members, illustratively a left side track member 12 and a right side track member 14, a powertrain assembly 500 (FIG. 13), a frame assembly 30, a body or tub 40 (FIG. 4), a roll cage assembly 50, and a suspension assembly 70 (FIG. 4). Vehicle 10 may be configured for military applications and is configured to travel through various terrains or surfaces. More particularly, vehicle 10 is configured for both land and amphibious operation. Additionally, vehicle 10 may be operated by remote control. In one embodiment, vehicle 10 may be configured to travel at speeds of approximately 50 mph during land operation.

As shown in FIG. 1, frame assembly 30 is supported on track members 12, 14. In one embodiment, track members 12, 14 may be comprised of a polymeric material (e.g., rubber) and may be approximately 12 inches in width (approximately 0.3 m). Frame assembly 30 also may support a plurality of body panels, for example a hood 16, a front fender 17, side fenders 18, and a rear fender 19. Front fender 17 and rear fender 19 are provided to protect components of vehicle 10 from dirt, mud, debris, and/or damage. Additionally, frame assembly 30 supports an operator area 20, which includes an operator seat 22, a passenger seat 24, a dash board assembly 25 (FIG. 6), and operator controls, as detailed further herein. Operator seat 22 and passenger seat 24 may be in a side-by-side arrangement and may include a seat back and a seat bottom. In the illustrative embodiment of vehicle 10 of FIG. 1, operator seat 22 is adjacent to and is separate from passenger seat 24. Alternatively, as shown in FIG. 4, operator seat 22 may be coupled to passenger seat 24 such that the seat bottoms are configured as a bench seat and the seat backs are configured as a single back rest.

Side fenders 18 are laterally outward of operator area 20 and may be provided as support structure for ingress and egress with vehicle 10. Hood 16 may support a front cargo area forward of operator area 20, as detailed further herein. Frame assembly 30 also may support a rear cargo area 28 rearward of operator area 20. Illustrative rear cargo area 28 may be a fixed cargo box. Alternatively, rear cargo area 28 may be a movable dump box configured to pivot upwardly and rearwardly for unloading cargo therefrom. In one embodiment, the base weight of vehicle 10 may be approximately 1750 lb (approximately 794 kg) and vehicle 10 may be configured to accommodate approximately 500 lbs (approximately 227 kg) of cargo. Vehicle 10 may be configured with features for distributing the weight of any cargo supported on vehicle 10 during land operation and amphibious operation. For example, the cargo weight may be distributed such that the combined center of gravity of vehicle 10 and the cargo is positioned approximately at a center point of vehicle 10. As such, vehicle 10 may not bias forwardly or rearwardly in the water during amphibious operation. As described herein, vehicle 10 may include a load level notification system to alert the operator of payload distribution.

Figure 2:
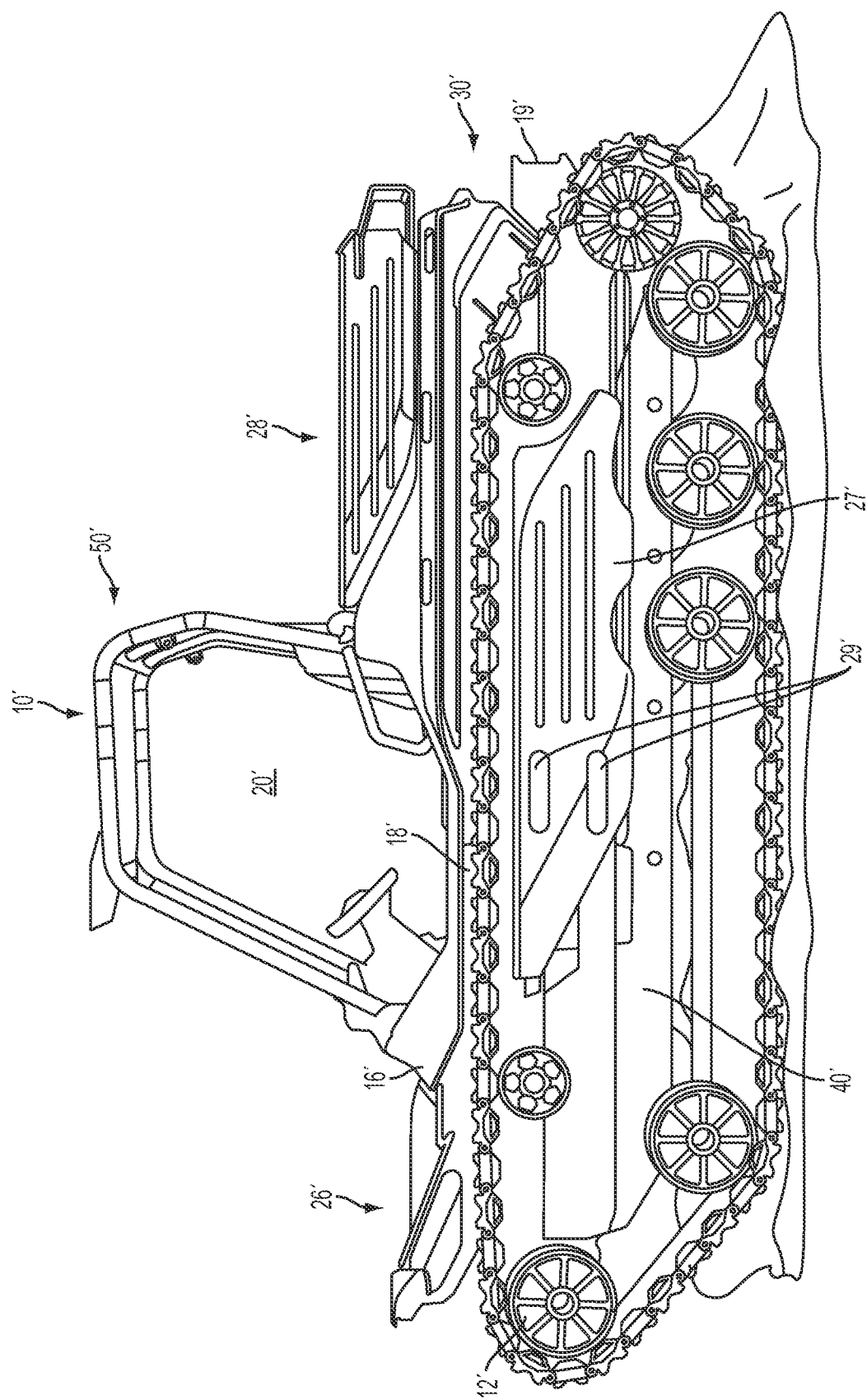
FIG. 2 is a left side view of an alternative embodiment of the vehicle of FIG. 1.

Referring to FIG. 2, an alternative embodiment of vehicle 10 is shown as vehicle 10'. Vehicle 10' includes features similar to those of vehicle 10, wherein like reference numbers indicate like components. Vehicle 10' includes a frame assembly 30' supported on at least one track member 12'. Frame assembly 30' also supports a hood 16', side fenders 18', and a rear fender 19'. Hood 16' may support a front cargo area 26' forward of an operator area 20' and a rear cargo area 28' may be positioned rearward of operator area 20'. Operator area 20' supports an operator seat and a passenger seat. Side fenders 18' are laterally outward of operator area 20' and may be provided for ingress and egress with vehicle 10'. Additionally, a side body panel 27' may be supported on frame assembly 30' and may include at least one step 29' for facilitating ingress and egress from operator area 20'. For example, when an operator or passenger is entering operator area 20', the operator or passenger may use step 29' in order to step onto side fender 18', which allows the operator or passenger to enter and leave operator area 20'.

Figure 3:
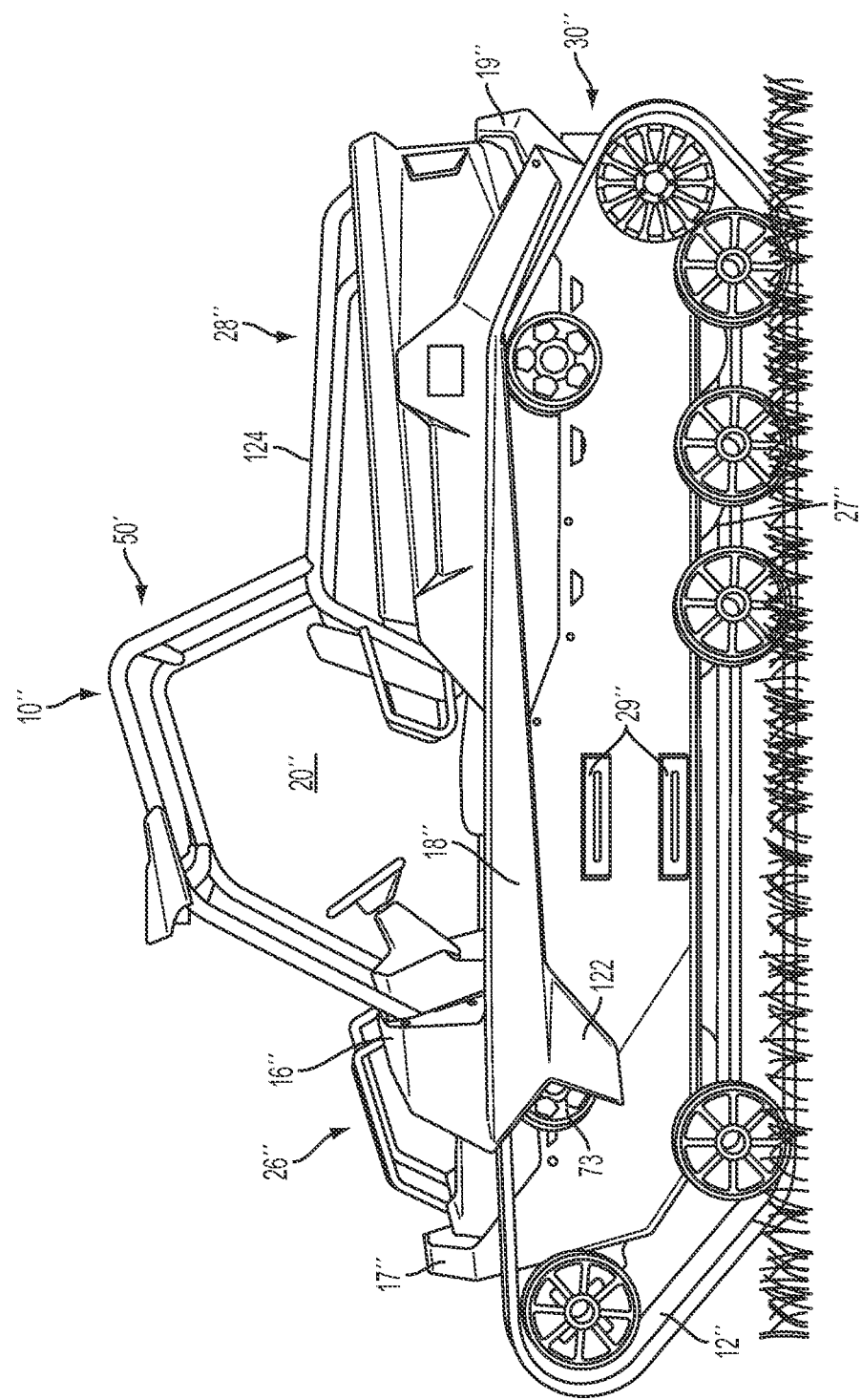
FIG. 3 is a left side view of an alternative embodiment of the vehicles of FIGS. 1 and 2.

Referring to FIG. 3, an alternative embodiment of vehicle 10 and vehicle 10' is shown as vehicle 10". Vehicle 10" includes features similar to those of vehicle 10 and vehicle 10', wherein like reference numbers indicate like components. Vehicle 10" includes a frame assembly 30" supported on at least one track member 12". Frame assembly 30" also supports a hood 16", a front fender 17", side fenders 18", and a rear fender 19". Additionally, frame assembly 30" supports an operator area 20", which includes an operator seat and a passenger seat. Side fenders 18" are laterally outward of operator area 20" and may be provided for ingress and egress with vehicle 10". Additionally, a side body panel 27" may be supported on frame assembly 30" and may include at least one step 29" for facilitating ingress and egress from operator area 20". Hood 16" may support a front cargo area 26" forward of operator area 20" and a rear cargo area 28" may be positioned rearward of operator area 20". Illustratively, rear cargo area 28" includes side bars or roll bars 124.

Figure 5:
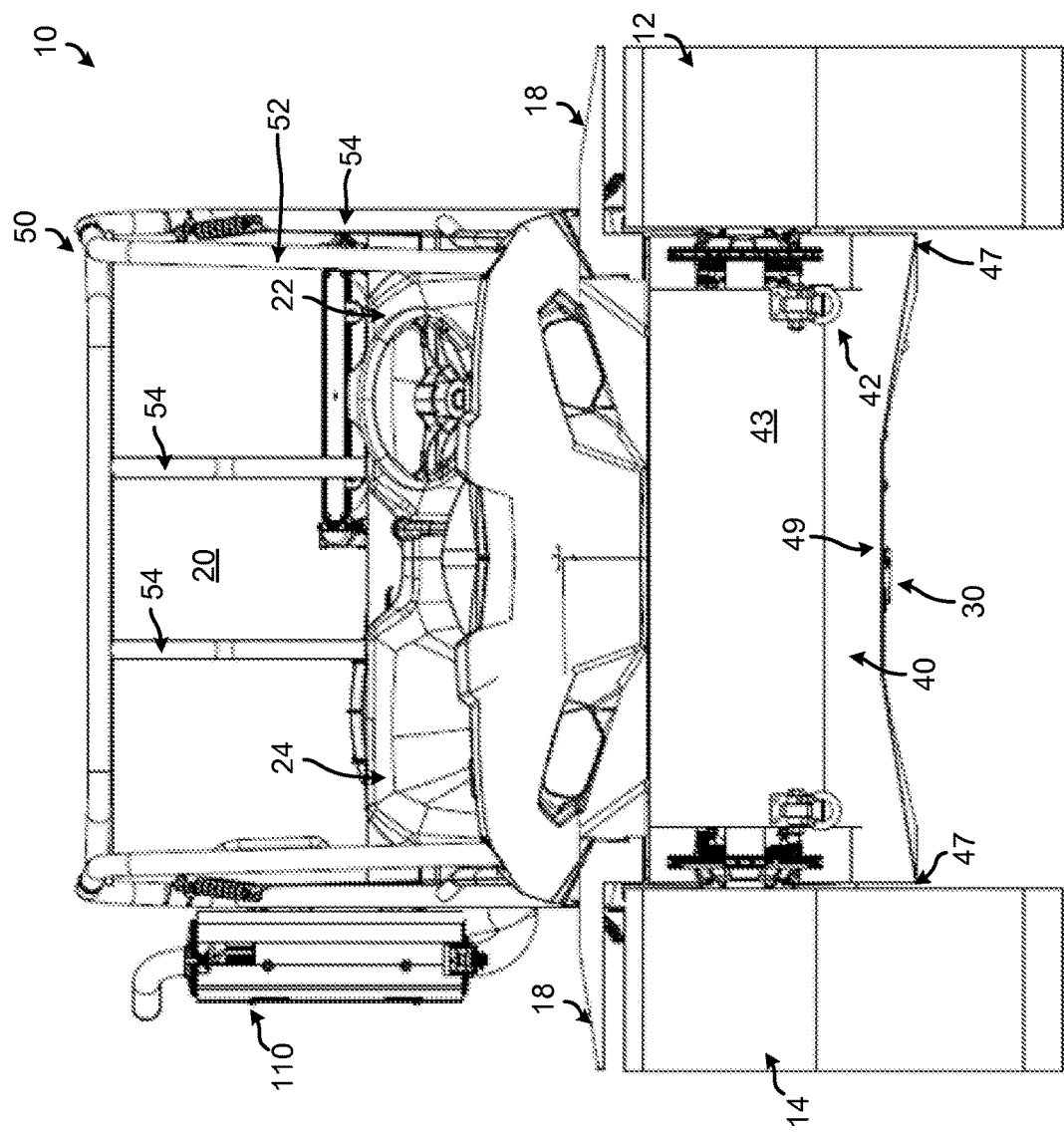
FIG. 5 is a front view of the vehicle of FIG. 4.
Figure 6:
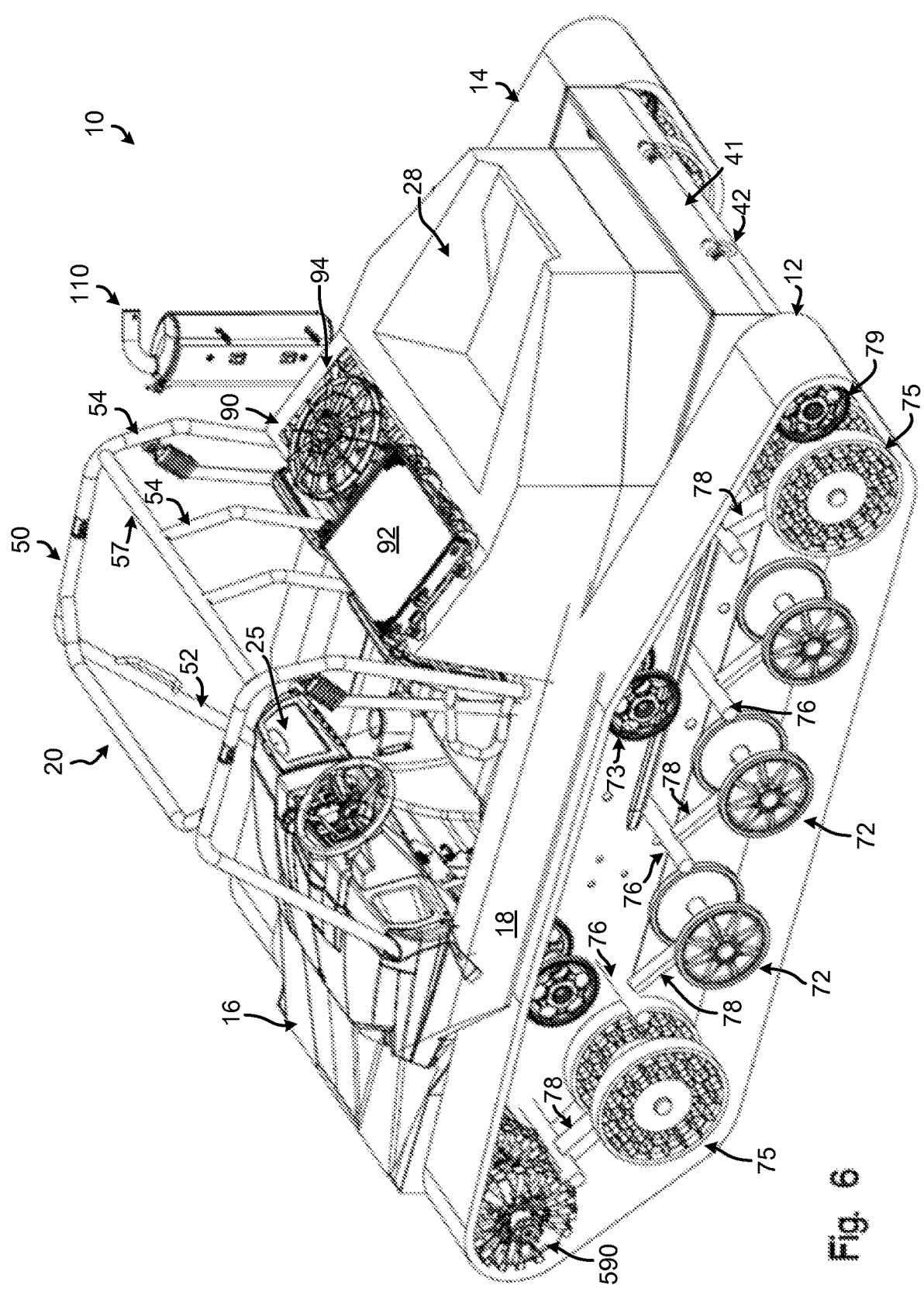
FIG. 6 is a left rear perspective view of the vehicle of FIG. 4.

Referring to FIGS. 4-6, an embodiment of vehicle 10 is shown. In one embodiment, track members 12, 14 may include PROSPECTOR II tracks available from Polaris Industries, Inc. located at 2100 Highway 55 in Medina, Minn. 55340. Illustrative track members 12, 14 are configured to rotate about suspension assembly 70 and are independently turnable relative to each other, as detailed further herein. More particularly, track members 12, 14 are supported by a plurality of guide or carrier rollers 72, 73, a plurality of load wheels 75, and a plurality of drive units 590, 592 of suspension assembly 70. When vehicle 10 is operating on track members 12 and 14, the operator and/or passenger may wear a safety harness, illustratively a seat belt 21, when in operator area 20.

In one embodiment, track members 12, 14 extend forwardly and rearwardly of frame assembly 30 and tub 40 such that track members 12, 14 define the full length of vehicle 10. As shown in FIGS. 2 and 3, by defining the forward-most and rearward-most ends of vehicle 10, track members 12, 14 are configured to contact an object before the object contacts tub 40 of vehicle 10. As such, track members 12, 14 may drive vehicle 10 over the object without damaging tub 40, frame assembly 30, front fender 17, and/or rear fender 19.

Figure 7A:
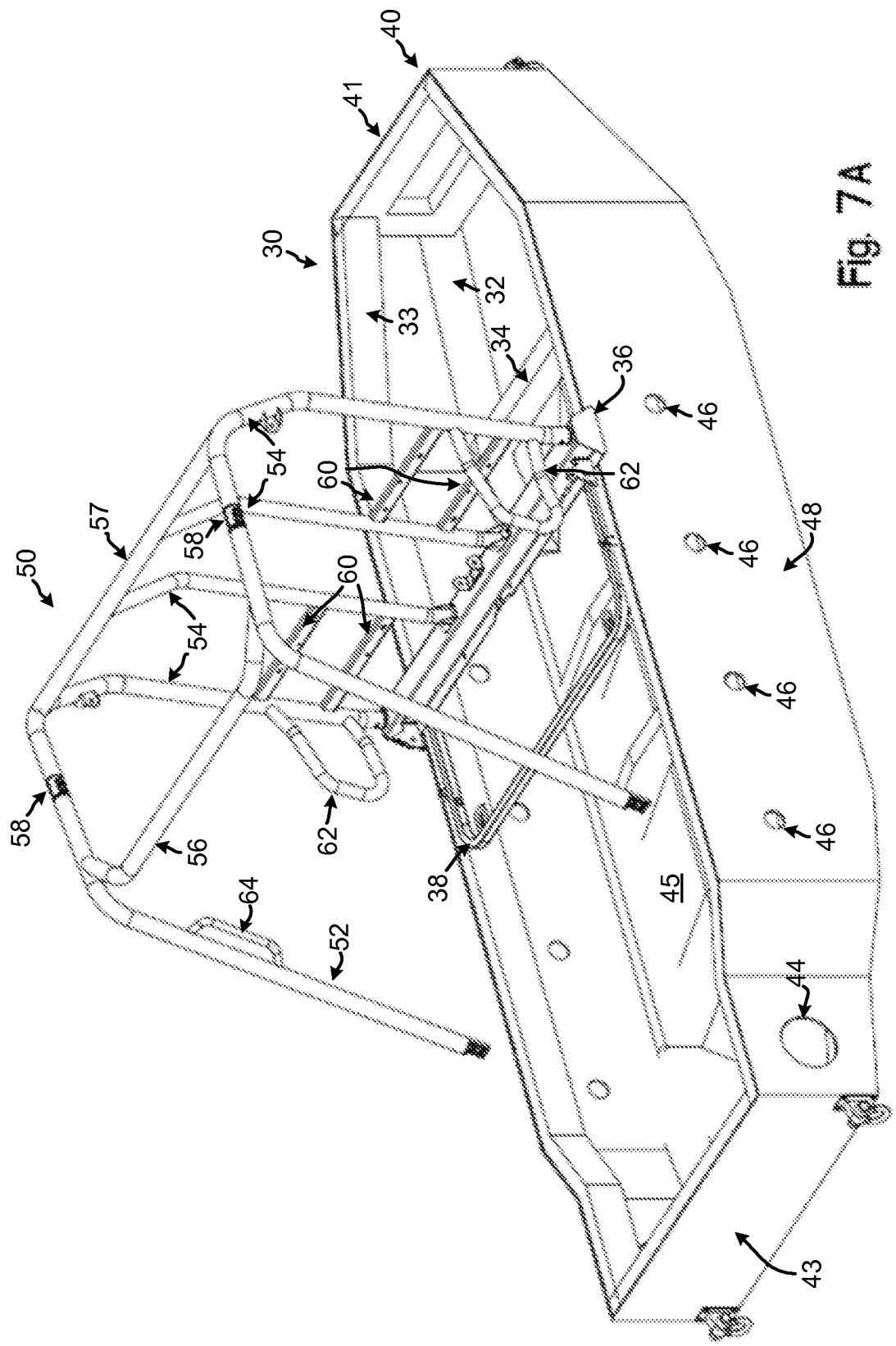
FIG. 7A is a left front perspective view of a frame assembly and a tub of the vehicle of FIG. 4.
Figure 7B:
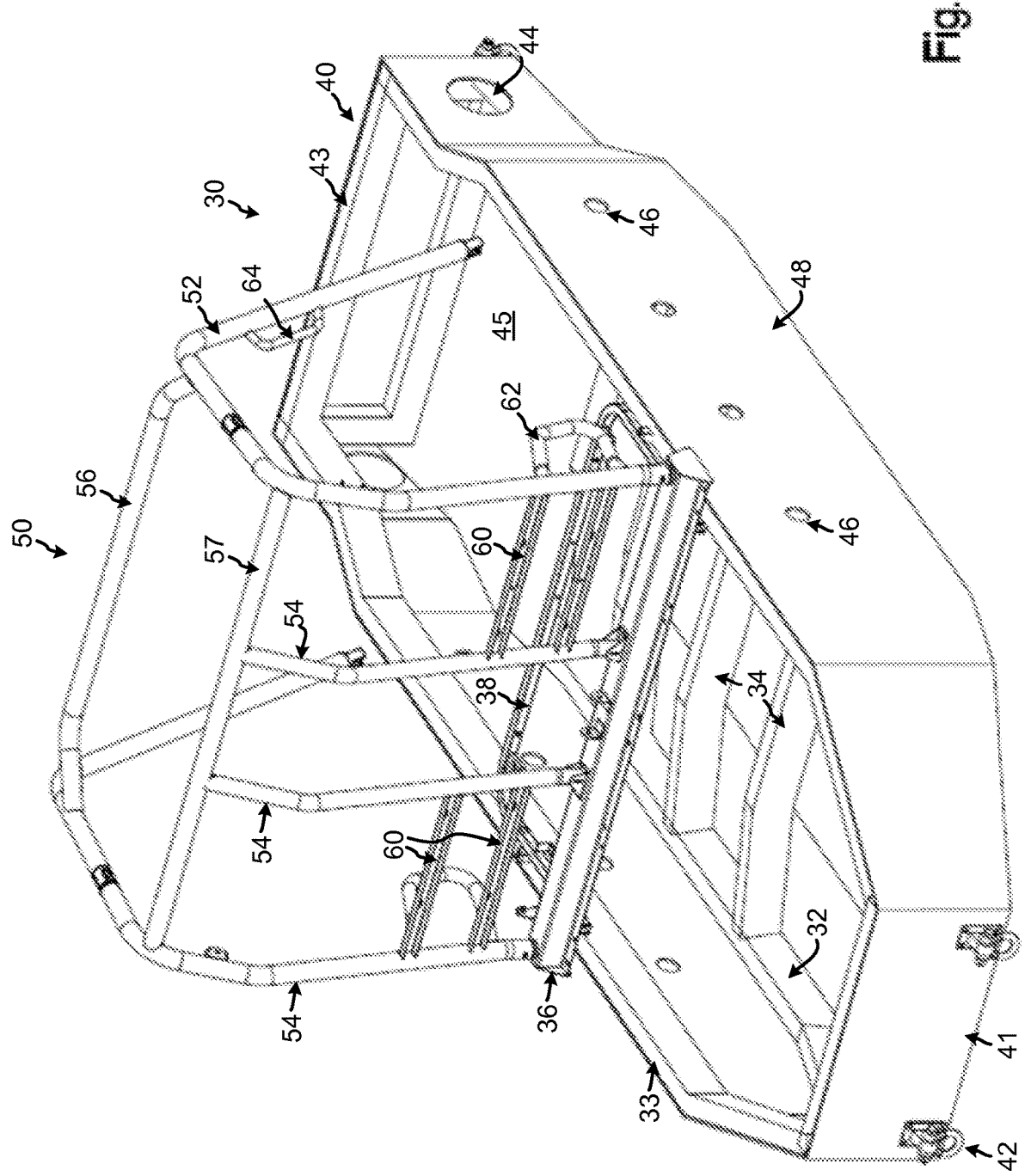
FIG. 7B is a right rear perspective view of the frame assembly and the tub of FIG. 7A.

Referring now to FIGS. 7A-7C, frame assembly 30 includes a plurality of lower longitudinal frame members 32, a plurality of upper longitudinal frame members 33, and a plurality of cross members 34. Illustrative frame assembly 30 includes at least two lower longitudinal frame members 32, at least two upper longitudinal frame members 33, and five cross members 34; however, frame assembly 30 may include varying quantities and arrangements of longitudinal frame members 32, 33 and cross members 34. Illustratively, upper longitudinal frame members 33 are supported at the top surface of tub 40 and may be coupled together and coupled to tub 40 with conventional fasteners, such as structural bonds, welds, rivets, bolts, and adhesive. Lower longitudinal frame members 32 and cross members 34 are supported on a bottom wall 45 of tub 40. Lower longitudinal frame members 32 and cross members 34 may be coupled together and coupled to tub 40 with conventional fasteners, such as structural bonds, welds, rivets, bolts, and adhesive. In one embodiment, the longitudinal length of frame assembly 30 and tub 40 may be approximately 11.5 ft (approximately 3.5 m) and the width of frame assembly 30 and tub 40 may be approximately 6.5 ft (approximately 2.5 m).

Longitudinal frame members 32, 33 and cross frame members 34 may be comprised of a metallic or polymeric material. Frame assembly 30 of FIGS. 7A-7C may be comprised of an aluminum material, for example 6061-T6 Aluminum. Similarly, tub 40 may be comprised of an aluminum material, for example 5052-H32 Aluminum. Alternatively, at least a portion of frame assembly 30 and/or tub 40 may include ultra-high molecular weight polyethylene. Additionally, frame assembly 30 and/or tub 40 may include a marine-grade pourable urethane coating and/or foam material inserts in order to fill volume voids and resist water ingestion during amphibious operation. As such, frame assembly 30 and tub 40 are configured to minimize water accumulation within vehicle 10. Flotation devices, such as inflatable units, may also be included and secured to vehicle 10 to further increase the buoyancy of vehicle 10 during amphibious operation. In one embodiment, vehicle 10 is configured to float at approximately 1,600 kg without any urethane materials, however, urethane materials may increase the buoyancy of vehicle 10 during amphibious operation.

As shown in FIGS. 7A and 7B, frame assembly 30 also includes a brace member 36 which is positioned above lower longitudinal frame members 32 and cross members 34. Brace member 36 may be coupled to a seat frame member 38 extending in a forward direction from brace member 36. Seat frame member 38 supports operator seat 22 and passenger seat 24 (FIG. 4). Illustratively, brace member 36 and seat frame member 38 are supported on upper longitudinal frame members 33 at the top surface of tub 40 and may be coupled thereto and coupled to each other with conventional fasteners, such as welds, bolts, rivets, adhesive, and/or structural bonds. As with longitudinal frame members 32, 33 and cross members 34, brace member 36 also may be comprised of an aluminum material and may include a urethane material to prevent water ingestion and to increase the buoyancy of vehicle 10.

Brace member 36 and tub 40 are configured to support roll cage assembly 50. Roll cage assembly 50 is coupled to brace member 36 and upper longitudinal frame members 33 with conventional fasteners, such as welds, bolts, rivets, adhesive, and structural bonds. In one embodiment, roll cage assembly 50 is configured to be removed from brace member 36 and upper longitudinal frame members 33. In a further embodiment, roll cage assembly 50 is permanently affixed to brace member 36 and upper longitudinal frame members 33.

Referring still to FIGS. 7A and 7B, roll cage assembly 50 includes a plurality of upstanding front members 52, a plurality of upstanding rear members 54, a front cross member 56, and a rear cross member 57. Roll cage assembly 50 may be comprised of a steel material. Front members 52 may be coupled to upper longitudinal frame members 33 and support grab bars 64 on both the operator side and the passenger side of roll cage assembly 50. Additionally, front members 52 are coupled to rear members 54 with couplers 58. Couplers 58 may be integral with front members 52 and/or rear members 54 or may be coupled thereto with welds, adhesive, bolts, rivets, or other fasteners. Additional details of couplers 58 may be included in U.S. Provisional Patent Application Ser. No. 61/788,874, filed on Mar. 15, 2013, the complete disclosure of which is expressly incorporated by reference herein.

Front cross member 56 is coupled to front members 52 and may be integrally formed thereto. Similarly, rear cross member 57 is coupled to rear members 54 and may be integrally formed thereto. Alternatively, front cross member 56 and rear cross member 57 may be coupled to front members 52 and rear members 54, respectively, with conventional fasteners, such as welds, rivets, bolt, adhesive, and/or structural bonds.

As shown in FIGS. 7A and 7B, illustrative roll cage assembly 50 includes four rear members 54 coupled to brace member 36 of frame assembly 30 and rear cross member 57. A plurality of rear braces 60 extend between two rear members 54. More particularly, two rear braces 60 are positioned behind operator seat 22 (FIG. 4) and are generally parallel to each other and coupled to two rear members 54. Similarly, two rear braces 60 are positioned behind passenger seat 24 (FIG. 4) and are generally parallel to each other and coupled to two rear members 54. The outermost rear members 54 also may support bolster bars 62 on both the operator side and the passenger side of roll cage assembly 50.

Front members 52, rear members 54, and cross members 56, 57 may have a profiled cross-section in a figure-eight or hourglass configuration. As such, front members 52, rear members 54, and cross members 56, 57 include recessed portions for receiving accessories, such as windows, doors, a front windshield, a rear windshield, and/or a roof, which may enclose operator area 20. The recessed portions of roll cage assembly 50 may include sealing members in order to sealingly enclose operator area 20. Additional details of the profiled configuration of front members 52, rear members 54, and cross members 56, 57, as well as the enclosing accessories (e.g., doors, windshields, windows, and/or a roof) are disclosed in U.S. Patent Application Publication No. 2013/0033070, filed on Jun. 8, 2012, the complete disclosure of which is expressly incorporated by reference herein. If operator area 20 is enclosed, operator area 20 may be configured to supply heat, defrost, and/or air conditioning, as well as other accessories, for the comfort and convenience of the operator and the passenger.

Referring still to FIGS. 7A-7C, tub 40 includes a rear wall 41, a front wall 43, bottom wall 45, and side walls 48. Front wall 43, rear wall 41, bottom wall 45, and side walls 48 may be integrally coupled together or may be welded, riveted, bolted, adhered, or otherwise fastened together. As shown in FIG. 5, bottom wall 45 may have an inverted "U" shape such that the center portion 49 of bottom wall 45 is elevated relative to the lower outer edges or a perimeter 47 of bottom wall 45. In one embodiment, bottom wall 45 of tub 40 has a ground clearance of approximately 6-15 inches (approximately 15-38 cm).

Figure 19:
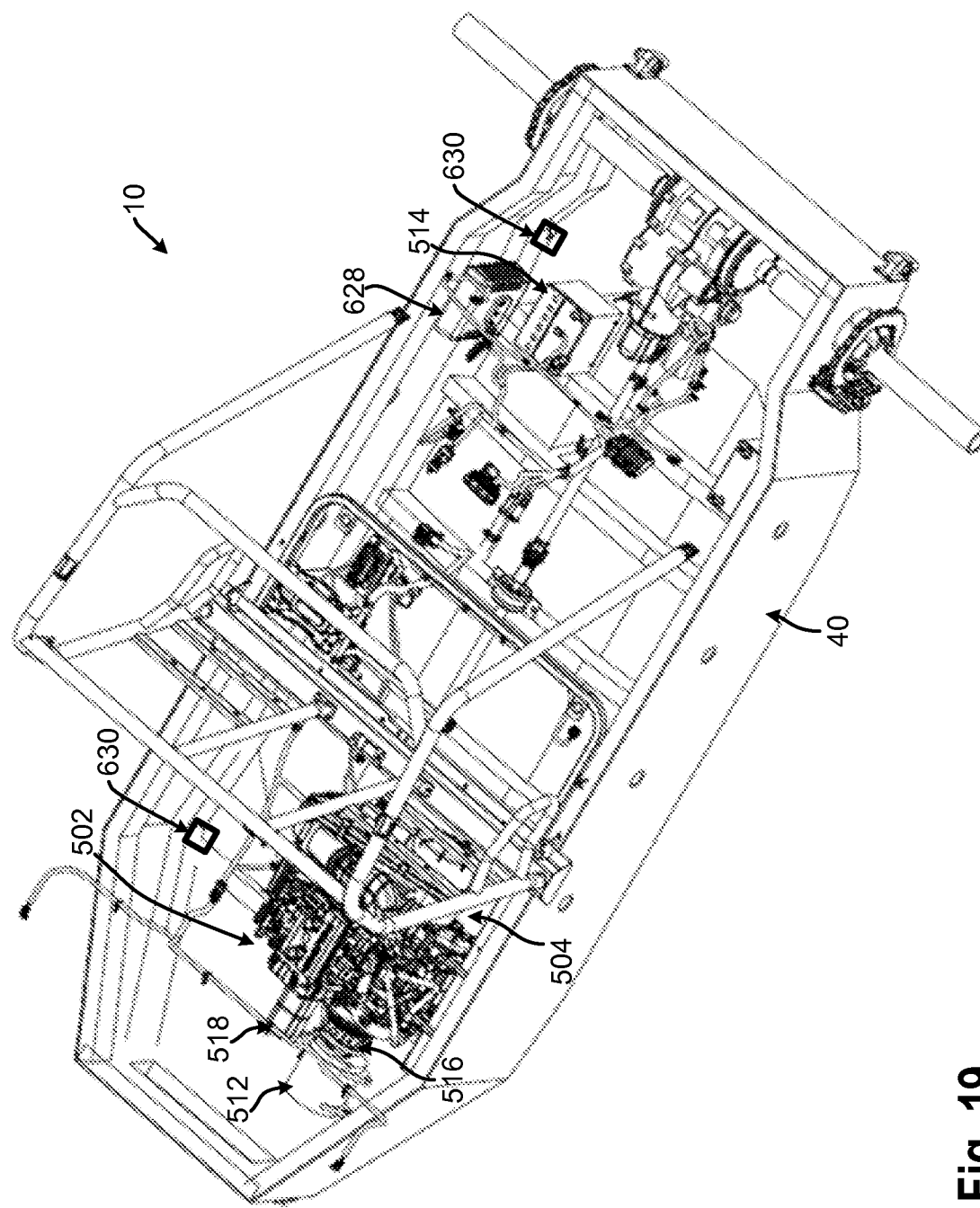
FIG. 19 is a front right perspective view of the frame assembly, the powertrain, and the electrical system of the vehicle of FIG. 4.

The inverted "U" shape of bottom wall 45 is designed to direct any water in tub 40 toward perimeter 47 of bottom wall 45. As shown in FIG. 19, vehicle 10 may include a plurality of pumps, for example bilge pumps 630, positioned around perimeter 47 of tub 40 in order to evacuate any water from tub 40. In one embodiment, vehicle 10 may include four pumps 630 coupled to bottom wall 45 at perimeter 47 (i.e., adjacent side walls 48) of tub 40. Pumps 630 may be configured for automatic operation upon the detection of water in tub 40 and/or may be manually operated. Vehicle 10 also may be configured to support a jet pump and/or propeller member to assist with amphibious operation, as detailed further herein.

Rear and front walls 41, 43 may include latches 42 which provides vehicle 10 with towing capabilities. Additional tie-downs, latches, hooks, or other members may be provided for attaching additional cargo or assisting with towing capacity. Illustrative vehicle 10 may have a towing capacity of approximately 500-1000 lbs (approximately 227-450 kg).

Side walls 48 of tub 40 include a plurality of openings. For example, side walls 48 include a plurality of axle openings 44 adjacent front wall 43. Axle openings 44 are configured to receive a front axle assembly 532 (FIG. 13), as detailed further herein. Additionally, side walls 48 include a plurality of openings 46, which may be configured to support additional components of vehicle 10 and/or may be used to drain water from tub 40 if water enters tub 40 during amphibious operation.

Figure 8:
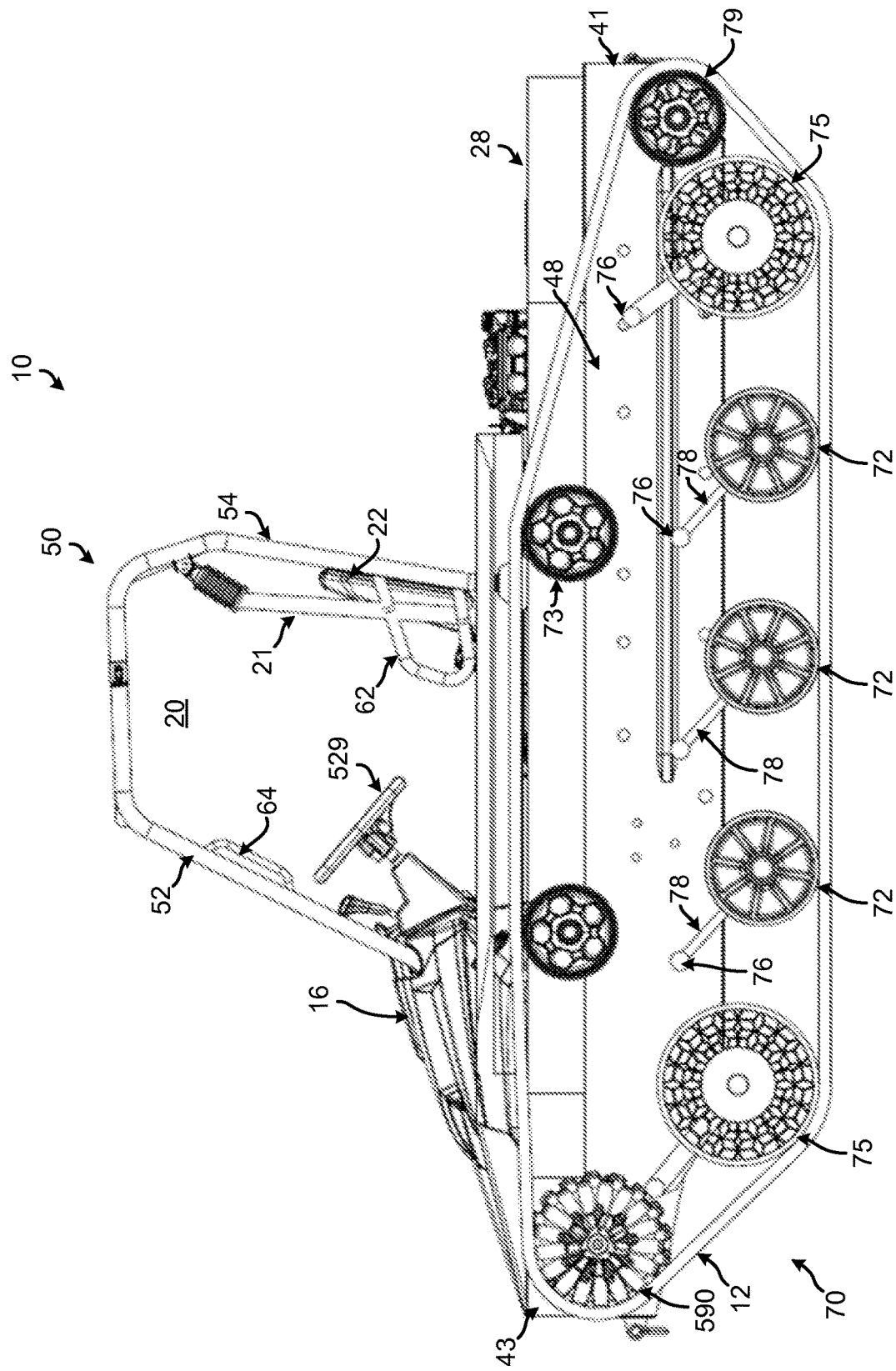
FIG. 8 is a side view of the vehicle of FIG. 4, showing a suspension assembly.
Figure 9A:
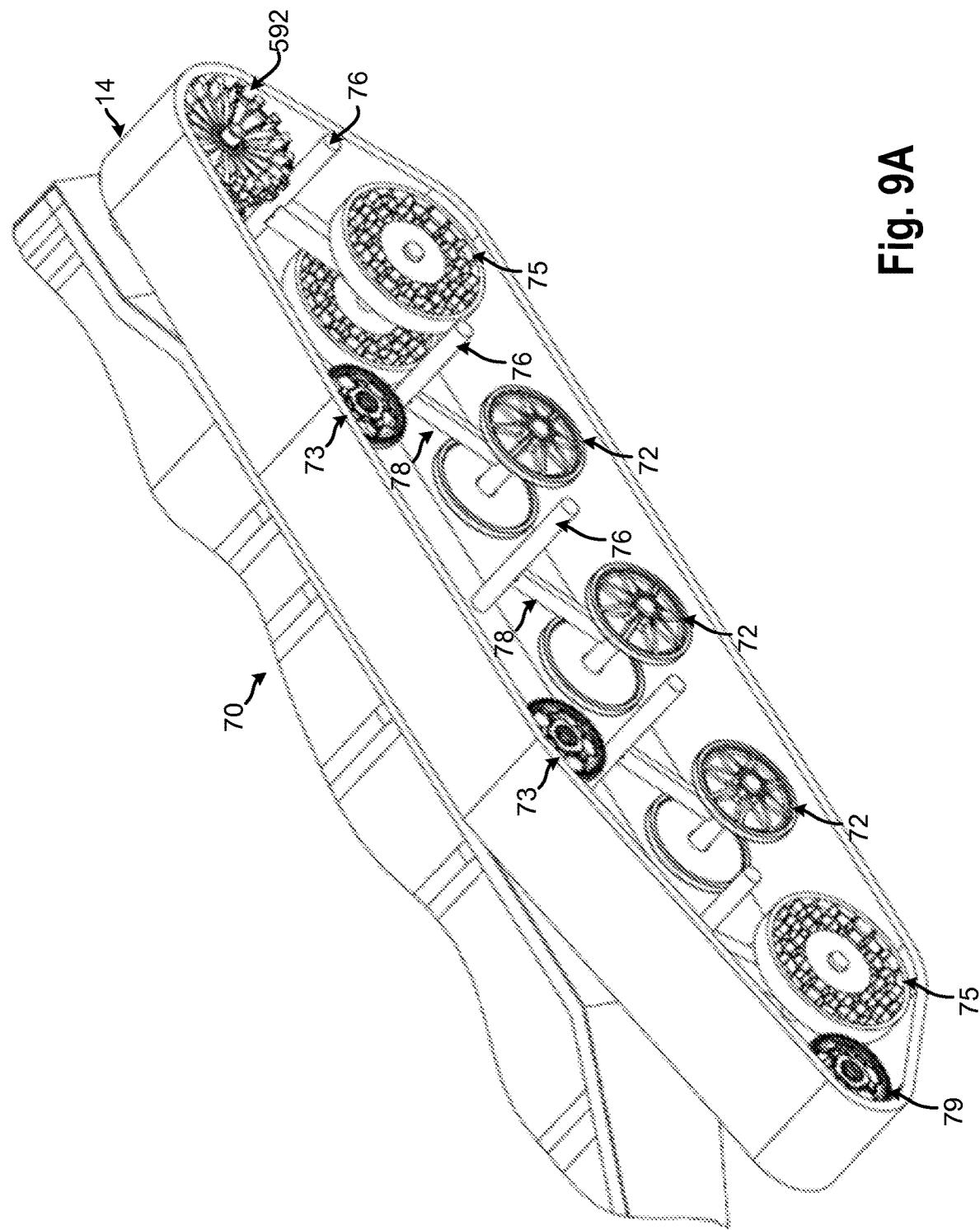
FIG. 9A is a top rear perspective view of the suspension assembly of FIG. 8.
Figure 9B:
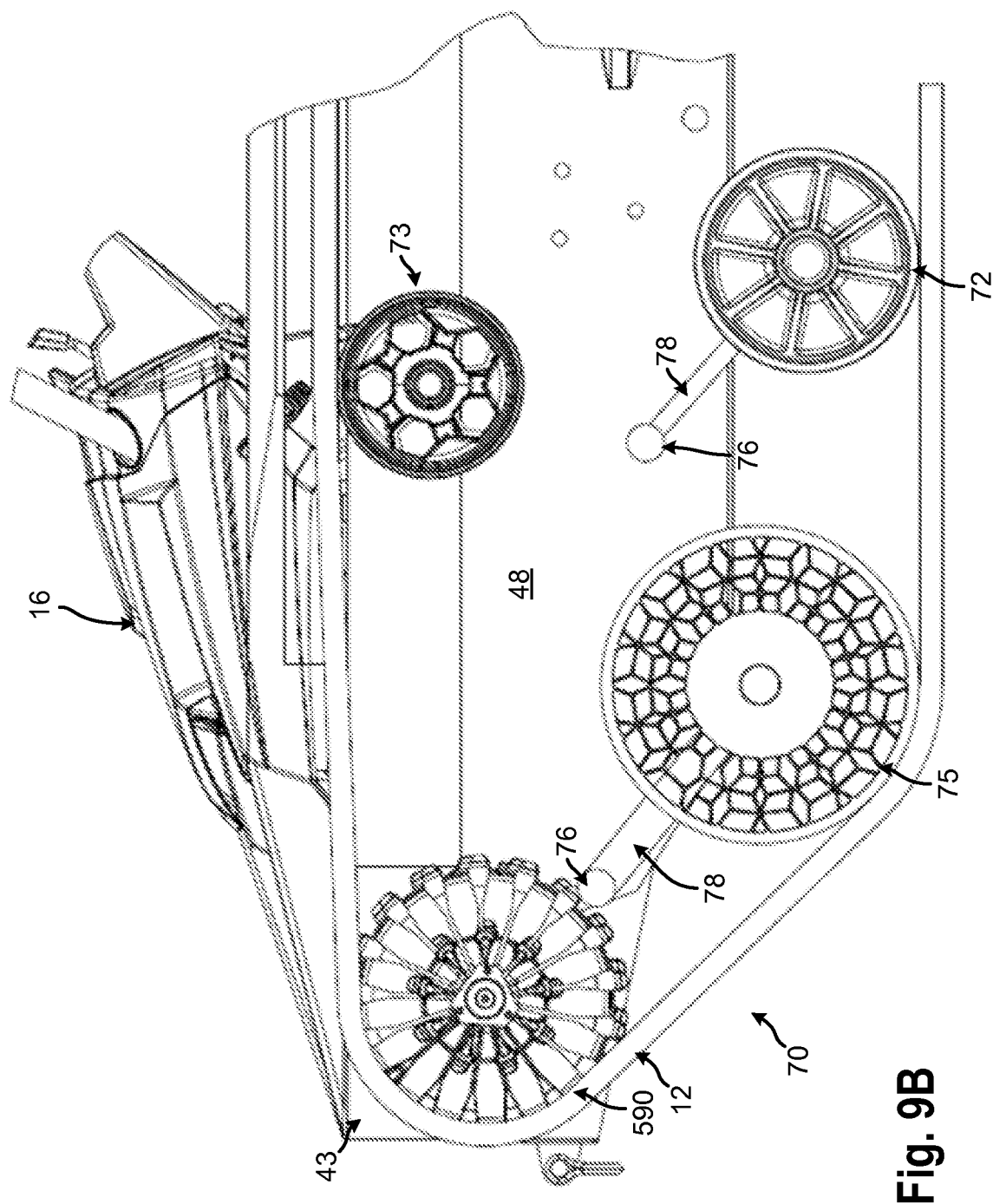
FIG. 9B is a detailed side view of the suspension assembly of FIG. 8.

Referring now to FIGS. 8, 9A, and 9B, suspension assembly 70 includes a plurality of lower guide or carrier rollers 72, a plurality of upper carrier rollers 73, drive units 590, 592, at least one idler wheel 79, and a plurality of load wheels 75. Carrier rollers 72 and 73, drive units 590, 592, idler wheel 79, and/or load wheels 75 may be comprised of metallic and/or polymeric materials. For example, as shown in FIGS. 9A and 9B, at least one load wheel 75 is configured as a non-pneumatic tire while carrier rollers 72, 73 and idler wheel 79 are configured as spoked wheels. In one embodiment, these spoked wheels are made of a polymer. Non-pneumatic tires may be comprised of a polymeric material and may be used to increase the compliance of suspension assembly 70 and track members 12, 14 during operation of vehicle 10.

Carrier rollers 72, 73, drive units 590, 592, and load wheels 75 are in contact with track members 12, 14 and are supported on side walls 48 of tub 40. In one embodiment, idler wheels 79 are connected to suspension members. Drive units 590, 592 may be supported by front axle assembly 532. Drive units 590, 592 are profiled to engage track members 12, 14, as detailed further herein. Upper carrier rollers 73 may be fixed to side walls 48 of tub 40. Upper carrier rollers 73 and idler wheel 79 are configured to maintain the tension in track members 12, 14. In one embodiment, for example on vehicle 10" of FIG. 3, at least one of upper carrier rollers 73 may be partially covered with a shroud 122. Shroud 122 may be integrally formed with side fender 18" or may be coupled thereto and/or to side body panel 27" with conventional fasteners.

Lower carrier rollers 72 and load wheels 75 may be operably coupled to side walls 48 of tub 40 with a plurality of shafts 76 and a plurality of control arms 78. As shown in FIGS. 4, 6, 8, 9A, and 9B, shafts 76 are coupled to side walls 48 with conventional fasteners (e.g., welds, rivets, bolts, adhesive) and an upper end of control arms 78 may be pivotally coupled to shafts 76. Lower ends of control arms 78 are operably coupled to lower carrier rollers 72 and load wheels 75. Load wheels 75 include a front load wheel 75a and a rear load wheel 75b and are configured to support the majority of the load of vehicle 10. Lower carrier rollers 72 are configured to support a portion of the load of vehicle 10 and also are configured to guide track members 12, 14 to prevent derailment. For example, load wheels 75 may support approximately 75% of the load of vehicle 10 while lower carrier rollers 72 may support approximately 25% of the load of vehicle 10.

Figure 9C:
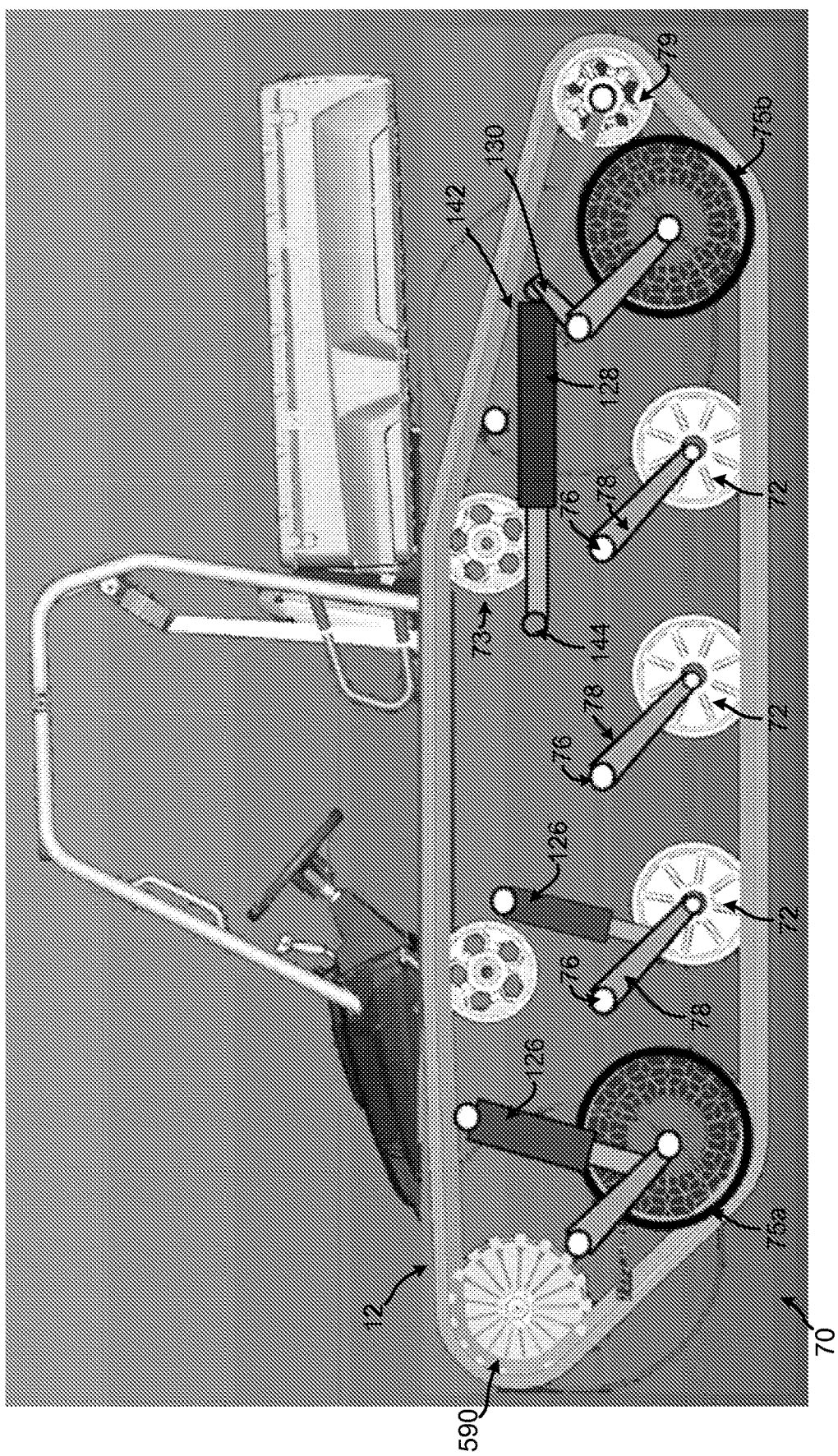
FIG. 9C is a side view of an alternative embodiment of the suspension assembly of FIG. 9A.

In one embodiment, as shown in FIG. 9C, shock absorbers 126 also may be supported on shafts 76. Illustratively, shock absorbers 126 have a generally vertical travel component and are coupled to control arms 78 of lower carrier rollers 72 and front load wheel 75a. Shock absorbers 126 may be positioned intermediate side walls 48 and control arms 78 such that shock absorbers 126 may be outboard of tub 40. Alternatively, shock absorbers 126 may be positioned inboard of tub 40. Shock absorbers 126 may be any linear force element. For example, shock absorbers 126 may be hydraulically operated and include springs. In one embodiment, shock absorbers 126 are adjustable coil-over damper type shock absorbers having a vertical travel of approximately 2-6 inches (approximately 5-16 cm).

As shown in FIG. 9C, an alternative embodiment of suspension 70 includes a rear shock absorber 128 operably coupled to rear load wheel 75b through a scissor link 130. Scissor link 130 is pivotably coupled to control arm 78 of rear load wheel 75 and is coupled to a movable end 142 of rear shock absorber 128. A fixed end 144 of rear shock absorber 128 may be coupled to tub 40 such that illustrative rear shock absorber 128 has a generally horizontal travel component. In one embodiment, rear shock absorber 128 is inboard of tub 40.

Figure 9D:
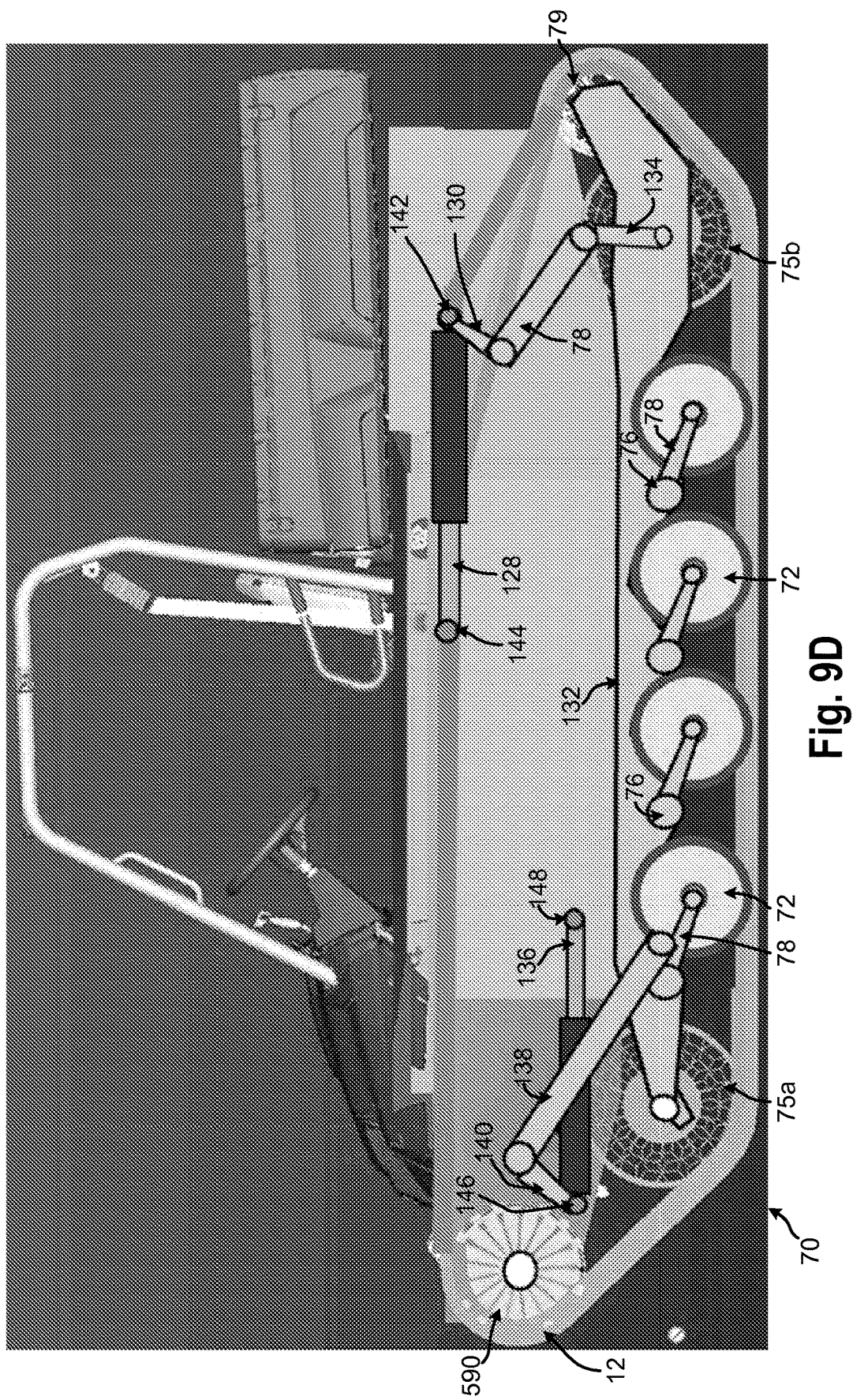
FIG. 9D is a side view of a further alternative embodiment of the suspension assembly of FIG. 9A.

Alternatively, as shown in FIG. 9D, suspension assembly 70 may include a carriage 132 operably coupled to front load wheel 75a, lower carrier rollers 72, rear load wheel 75b, and idler wheel 79. Carriage 132 extends in a generally horizontal direction and may be generally parallel with a portion of track members 12, 14. Lower carrier rollers 72 are pivotably coupled to carriage 132 through shafts 76 and control arms 78. As such, lower carrier rollers 72 are configured to pivot or otherwise move independently relative to carriage 132 and each other in order to envelope an object on the ground or other surface during operation of vehicle 10. Additionally, all lower carrier rollers 72 are configured to move together with carriage 132, as detailed further herein, in order to maintain the tension in track members 12, 14. In one embodiment, each roller 72 may be biased downwardly from carriage 132 with a biasing member, such as with shock absorbers, for example.

As shown in FIG. 9D, carriage 132 also is operably coupled to rear shock absorber 128 through control arm 78 coupled to rear load wheel 75b and scissor link 130. Additionally, control arm 78 coupled to rear load wheel 75b is coupled to a pivot link 134. Pivot link 134 is pivotably coupled to carriage 132 and control arm 78. As such, as carriage 132 moves during operation of vehicle 10, pivot link 134, control arm 78 and scissor link 130 are configured to adjust movable end 142 of rear shock absorber 128. As detailed herein, rear shock absorber 128 is positioned inboard of tub 40.

Referring still to FIG. 9D, the alternative embodiment of suspension assembly 70 also includes a front shock absorber 136 operably coupled to carriage 132 through a torque arm 138 and a scissor link 140. Illustratively, front shock absorber 136 may have a generally horizontal travel component and may be positioned inboard of tub 40. More particularly, a fixed end 148 of front shock absorber 136 may be coupled to an inner surface of side wall 48 of tub 40. Scissor link 140 is operably coupled to a moveable end 146 of front shock absorber 136 and is pivotably coupled to torque arm 138.

In operation, suspension assembly 70 of FIG. 9D is configured to move upwardly and rearwardly when track members 12, 14 encounter objects on the ground. The combined upward and rearward movement of carriage 132 also moves lower carrier rollers 72 in an upward and rearward direction which maintains the tension in track members 12, 14. Additionally, because each lower carrier roller 72 is separately coupled to carriage 132, each lower carrier roller 72 is configured for independent movement which allows lower carrier rollers 72 to envelope objects on the ground or other surface for increase ride and handling characteristics of vehicle 10.

Figure 10:
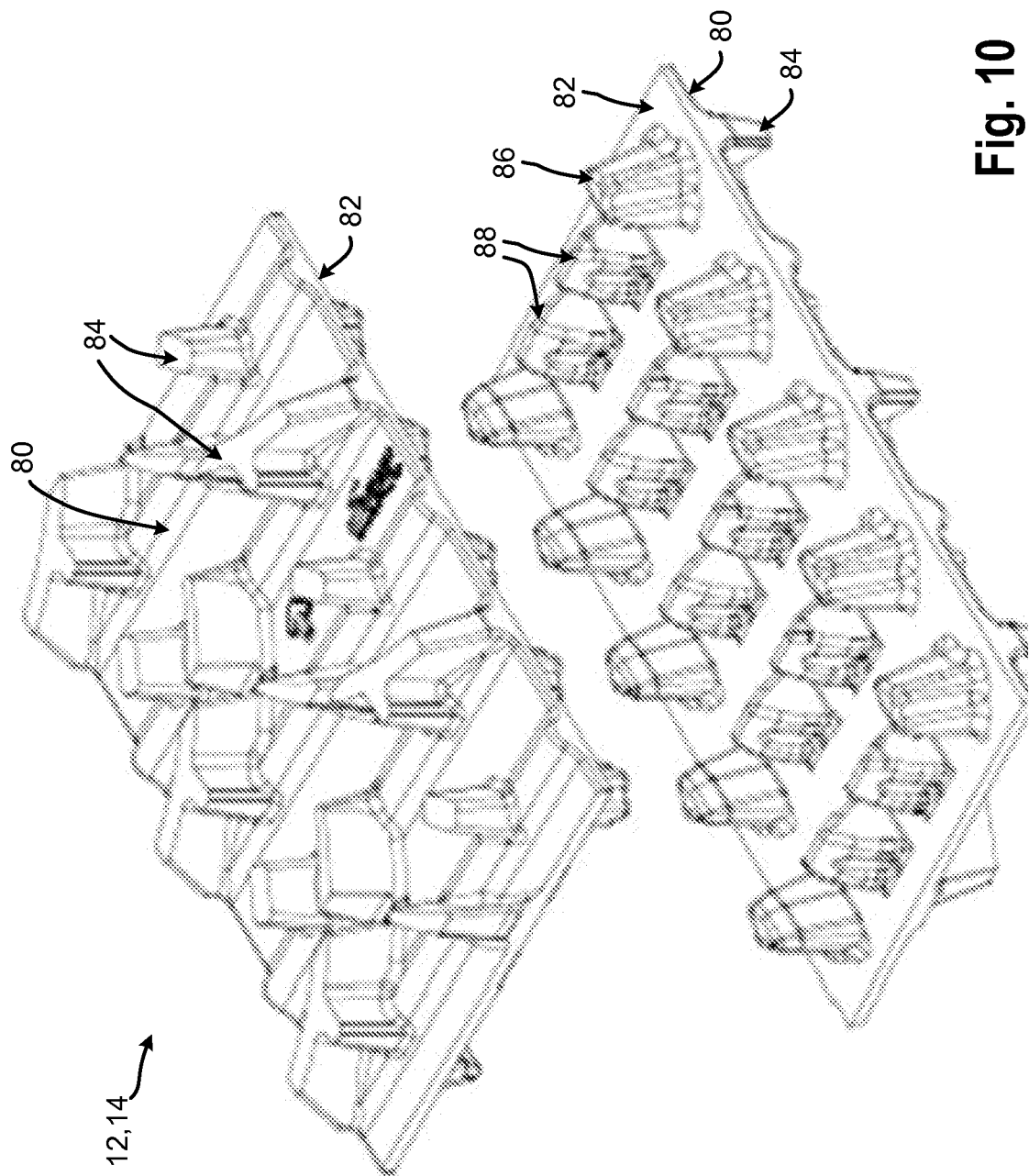
FIG. 10 is a perspective view of a track of the vehicle of FIG. 4.

Referring to FIG. 10, track members 12, 14 are defined by an outer surface 80 which includes a plurality of lugs 84 and an inner surface 82 which includes a plurality of guide members 88 and a plurality of drive members 86. Lugs 84 on outer surface 80 contact the ground and other objects when vehicle 10 is operating. Drive members 86 and guide members 88 on inner surface 82 contact carrier rollers 72, 73, drive units 590, 592, and load wheels 75 in order to secure and maintain the alignment of track members 12, 14 on carrier rollers 72, 73, drive units 590, 592, and load wheels 75. Additionally, the raised profile of drive members 86 and guide members 88 is configured to compliment the profile of at least drive units 590, 592 in order to drive track members 12, 14 from front axle assembly 532.

In operation, each control arm 78 and the corresponding lower carrier roller 72 coupled thereto moves independently of the other control arms 78 and lower carrier rollers 72. As such, each lower carrier roller 72 is able to move in its own path when traversing objects or terrain. More particularly, because each lower carrier roller 72 is configured for independent movement, each lower carrier roller 72 and track members 12, 14 may envelope or generally surround an object on the ground.

Additionally, as lower carrier rollers 72 and load wheels 75 contact the ground and other objects during operation of vehicle 10, lower carrier rollers 72 and load wheels 75 move upwardly and rearwardly. Because track members 12, 14 are secured on carrier rollers 72, 73, load wheels 75, and drive units 590, 592, the upward and rearward movement of lower carrier rollers 72 and load wheels 75 maintains the tension in track members 12, 14 when suspension assembly 70 moves relative to tub 40.

Referring now to FIG. 6, a cooling assembly 90 is shown. Cooling assembly 90 includes a radiator 92 and a fan 94. Illustratively, cooling assembly 90 is positioned rearward of operator area 20 and forward of rear cargo area 28. Cooling assembly 90 may be elevated relative to track members 12, 14 such that amphibious operation of vehicle 10 does not submerge or otherwise affect cooling assembly 90. Cooling assembly 90 is illustratively elevated above cargo area 28. Additionally, cooling assembly 90 may be positioned in an angular configuration. Alternative arrangements of cooling assembly 90 may be positioned at other locations of vehicle 10.

Figure 11:
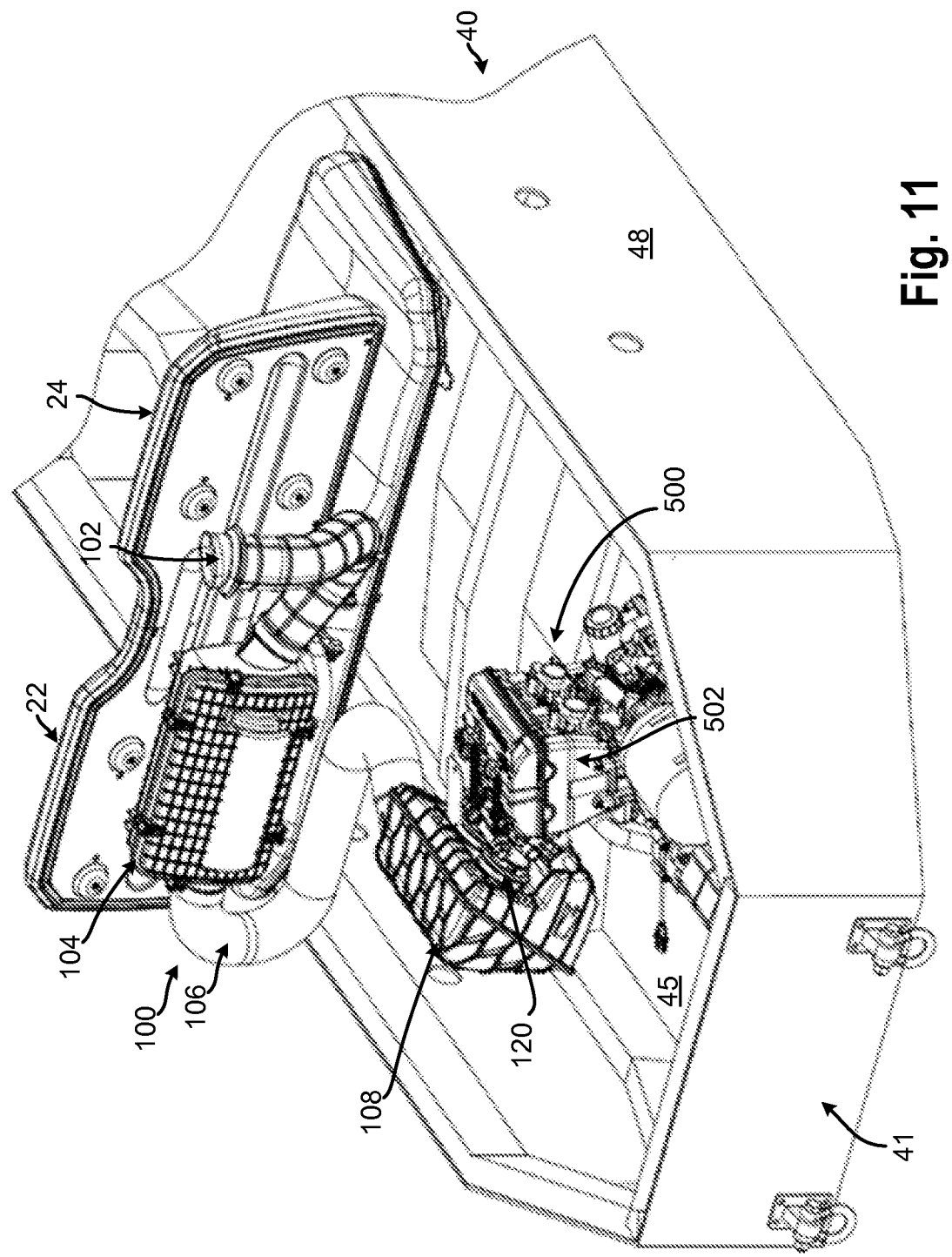
FIG. 11 is right rear perspective view of an air intake assembly of the vehicle of FIG. 4.

As shown in FIG. 11, vehicle 10 also includes an air intake assembly 100 illustratively partially positioned below rear cargo area 28. Air intake assembly 100 includes an air intake port 102, a filter box 104, a hose 106, and an air box 108. Air intake assembly 100 is positioned rearward of operator seat 22 and passenger seat 24 and is operably coupled to powertrain assembly 500. Illustratively, air intake port 102 is elevated relative to bottom wall 45 of tub 40 and relative to tops of track members 12, 14 such that air intake port 102 is not submerged or otherwise affected during amphibious operation of vehicle 10. In one embodiment, air intake port 102 may have a built-in snorkel for drawing in air from above the water line during amphibious operation of vehicle 10. Air intake port 102 is coupled to filter box 104, which includes a filter (not shown) sealed by a housing 103. Filter box 104 is fluidly coupled to air box 108. Air box 108 is sealingly coupled to throttle bodies 120 of an engine 502 of powertrain assembly 500 in order to supply air to engine 502.

Figure 12:
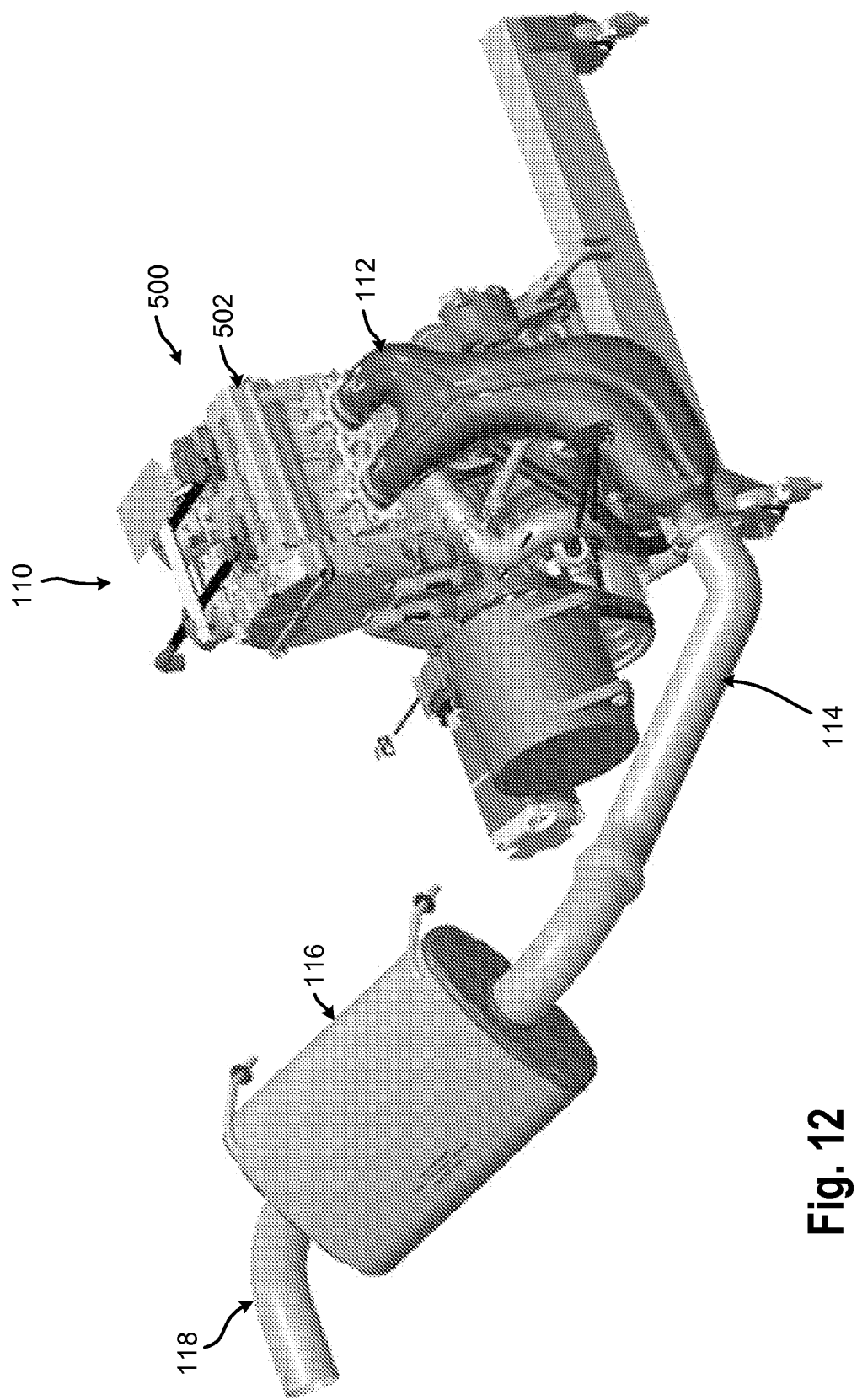
FIG. 12 is a right rear perspective view of an exhaust assembly of the vehicle of FIG. 4.
Figure 16:
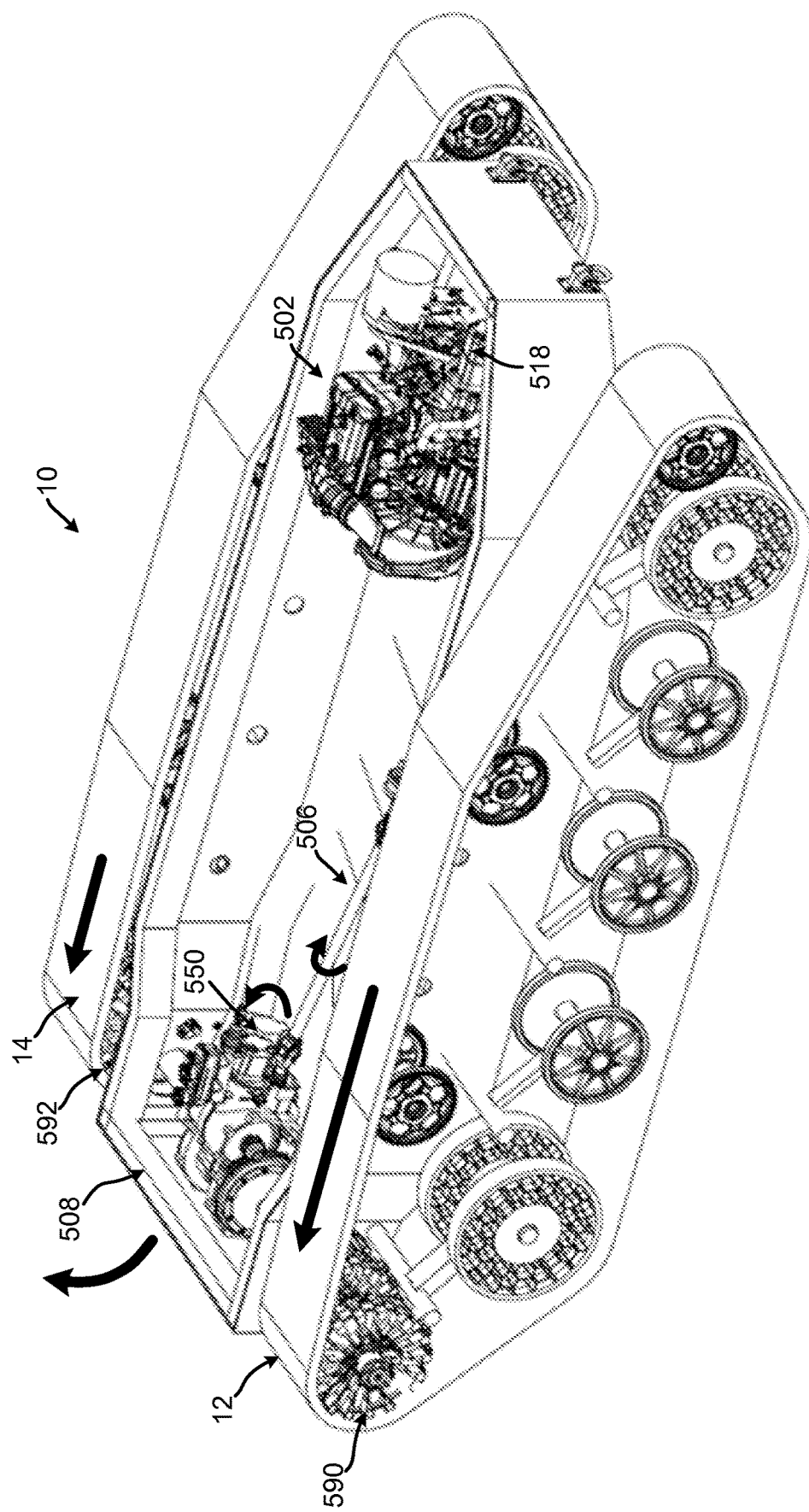
FIG. 16 is a rear left perspective view of the vehicle of FIG. 4 illustrating a turning operation.

Referring to FIG. 12, vehicle 10 also includes an exhaust assembly 110. Exhaust assembly 110 includes a manifold 112, an exhaust pipe 114, a muffler 116, and a tail pipe 118. Illustratively, manifold 112 is coupled to engine 502 and to exhaust pipe 114. Exhaust pipe 114 extends between manifold 112 and muffler 116. Tail pipe 118 is coupled to muffler 116 in order to exhaust gases from vehicle 10. In one embodiment, exhaust assembly 110 is elevated relative to bottom wall 45 of tub 40 such that amphibious operation of vehicle 10 does not submerge or otherwise affect exhaust assembly 110. Tail pipe 118 is elevated above track members 12, 14, as illustrated in FIG. 16.

Figure 13:
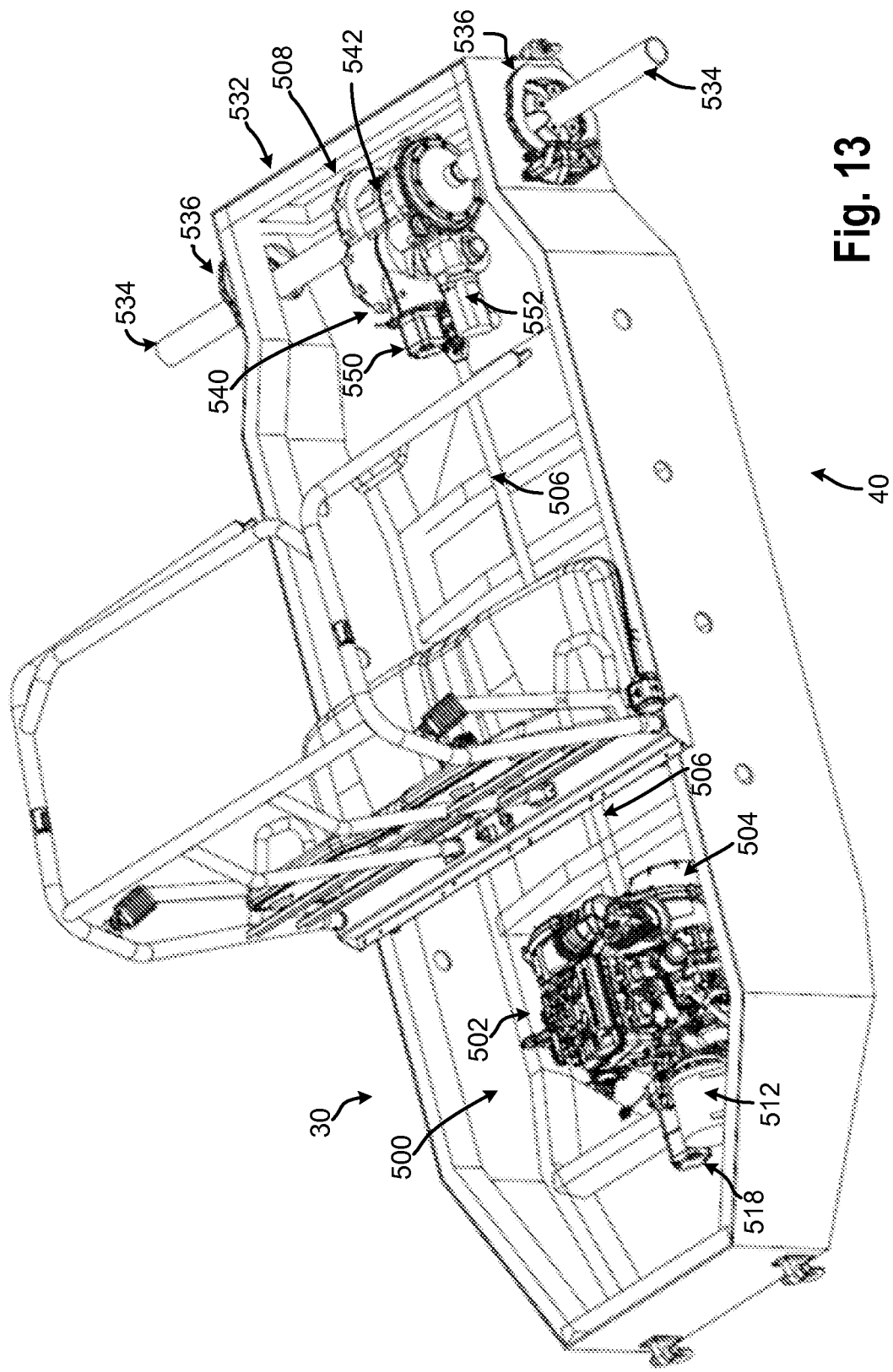
FIG. 13 is a rear right perspective view of a powertrain system of the vehicle supported by the frame assembly.
Figure 14:
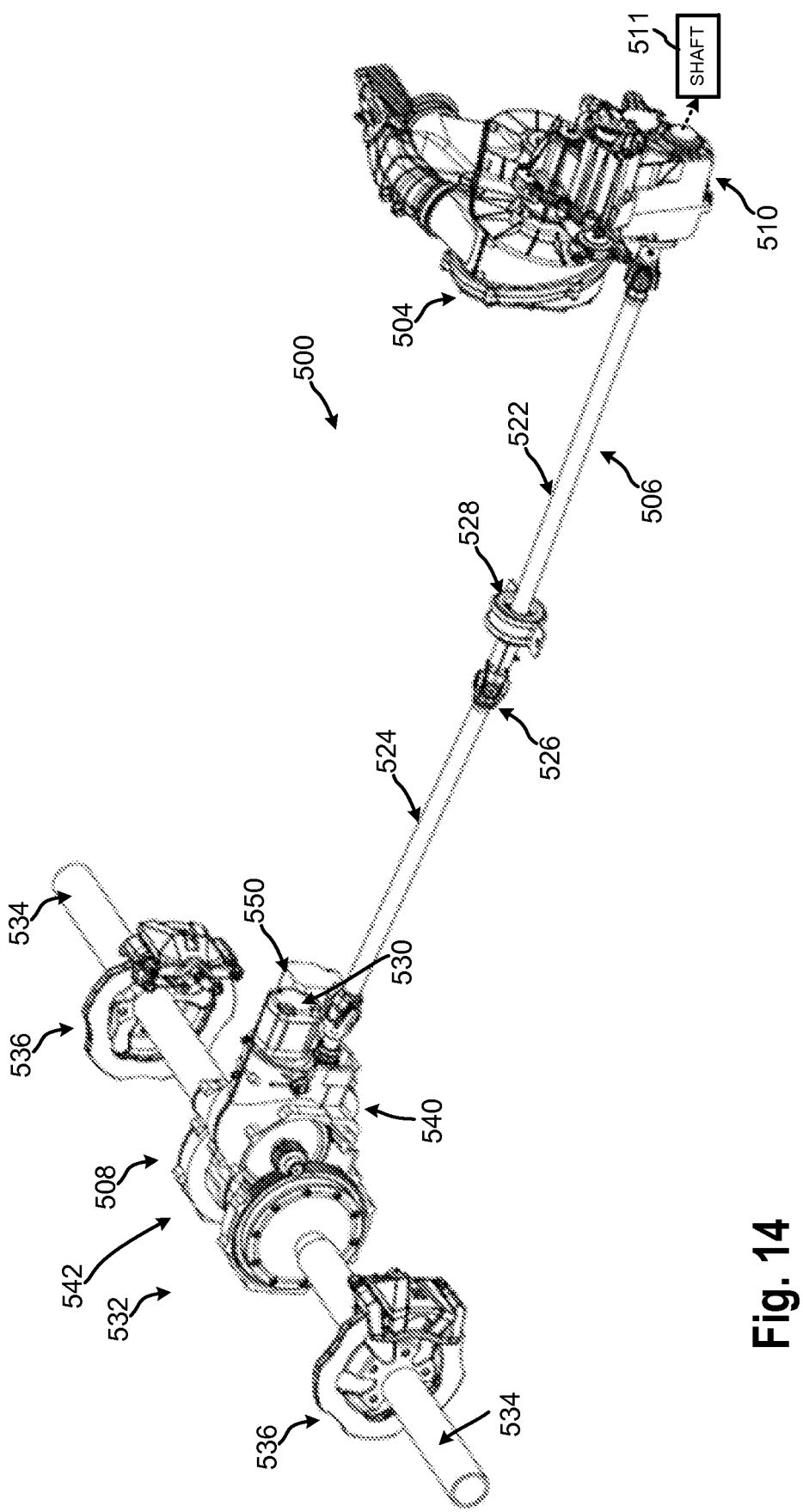
FIG. 14 is a rear left perspective view of the powertrain system of FIG. 13.
Figure 20:
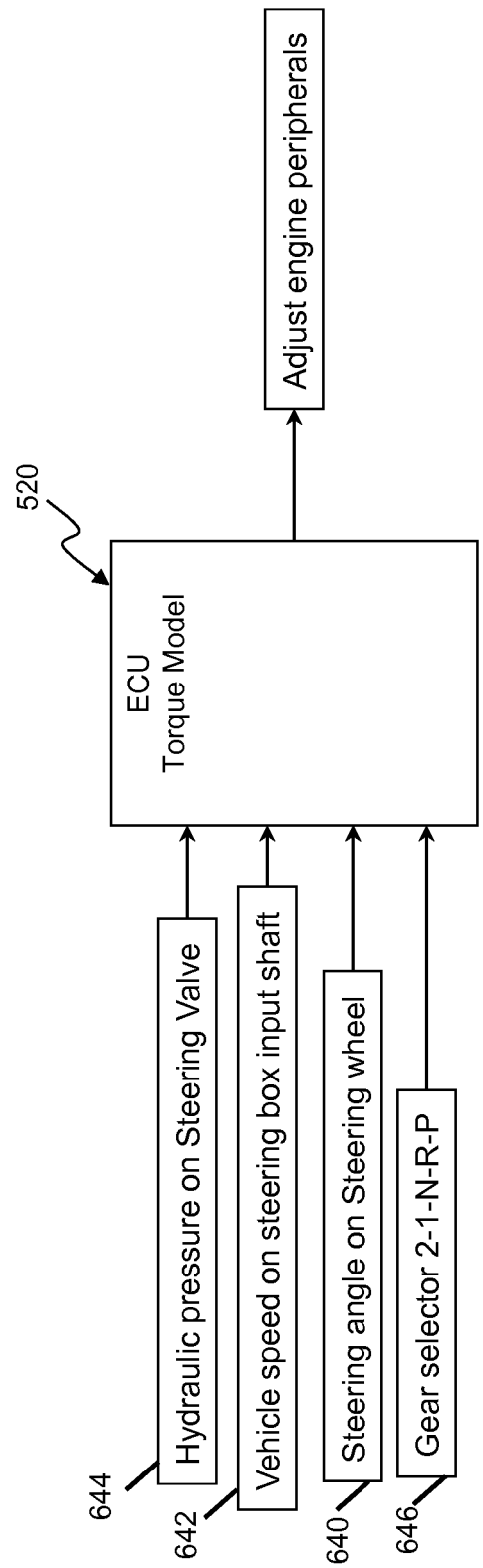
FIG. 20 is a block diagram illustrating a torque compensation function of an engine control unit of the vehicle of FIG. 4.

Referring to FIGS. 13 and 14, a powertrain system 500 is supported by frame assembly 30 for driving tracks 12, 14 of vehicle 10. Powertrain system 500 includes an engine 502, a transmission 504 coupled to an output of engine 502, and a drive shaft 506 coupled to an output of transmission 504. Powertrain system 500 further includes a steering and drive assembly 508 coupled to an opposite end of drive shaft 506. Engine 502 and transmission 504 are positioned in a rear portion of vehicle 10 behind operator seat 22, and steering and drive assembly 508 is positioned in a front portion of vehicle 10 in front of operator seat 22. In an exemplary embodiment, engine 502 is an internal combustion engine having an electronically controlled throttle valve controlled by an engine control unit (ECU) 520 (FIG. 20). An exemplary engine control system is detailed further herein and in U.S. patent application Ser. No. 13/153,037, filed on Jun. 3, 2011, titled "ELECTRONIC THROTTLE CONTROL," the entire disclosure of which is incorporated by reference herein. Engine 502 is detailed further in U.S. patent application Ser. No. 13/242,239, filed on Sep. 23, 2011, titled "ENGINE," the entire disclosure of which is incorporated by reference herein.

In the illustrated embodiment, transmission 504 includes an electrically controlled continuously variable transmission (CVT), as detailed further in U.S. patent application Ser. No. 13/652,253, filed on Oct. 15, 2012, the complete disclosure of which is incorporated by reference herein. Transmission 504 is controlled by ECU 520 (FIG. 20) or by another suitable controller, such as a transmission control unit. The output of transmission 504 is operably coupled to a gearbox 510 (FIG. 14), and the output of gearbox 510 is drivingly coupled to drive shaft 506. In one embodiment, gearbox 510 includes a sub-transmission geared to provide selectable operating gears. For example, gearbox 510 may shifted to a high gear, a low gear, a reverse gear, a neutral gear, and a park configuration. High gear provides a higher top speed of vehicle 10 than the top speed of low gear, and low gear provides greater low end torque. In one embodiment, a shift lever positioned in the operator area of vehicle 10 is operably coupled to gearbox 510 for shifting gearbox 510 between operating gears. Fewer or additional sub-transmission gears may be provided.

As illustrated in FIG. 14, gearbox 510 drives an attachment shaft 511 for transferring engine torque to an attachment or implement (e.g., a work tool) attached to vehicle 10. Attachment shaft 511 illustratively extends outwardly from a backside of gearbox 510 opposite drive shaft 506 and towards the back of vehicle 10 (e.g., through an aperture of the tub) for attaching the external implement. In one embodiment, attachment shaft 511 provides a power take-off for driving the implement with engine 502. In one embodiment, gearbox 510 selectively engages attachment shaft 511 based on an operator input. For example, the shift lever may be actuated to engage attachment shaft 511 to power the implement coupled to vehicle 10. In one embodiment, a clutch assembly is selectively engaged by the operator to engage attachment shaft 511 via gearbox 510. The clutch assembly may be hydraulically or electronically operated. In one embodiment, attachment shaft 511 is used to drive a jet pump and/or propeller member to assist in propelling vehicle in water during amphibious operation.

Drive shaft 506 illustratively extends through the center of frame assembly 30 in the tub 40 below the operator seat 22. In one embodiment, drive shaft 506 extends through a tunnel provided below seat 22. As illustrated in FIG. 14, drive shaft 506 includes a first portion 522 coupled to gear box 510, a second portion 524 drivingly coupled to an input shaft 530 of steering and drive assembly 508, and a u-joint 526 coupling first portion 522 to second portion 524. A support bracket 528 is configured to couple to frame 30 to rotatably support drive shaft 506. Support bracket 528 includes an internal bearing surface that receives drive shaft 506.

Referring to FIGS. 13 and 19, an alternator 512 is coupled to engine 502 for charging one or more vehicle batteries 514 (FIG. 19) and for providing electrical power to electronic components of vehicle 10. In an exemplary embodiment, alternator 512 is a 24 volt, 110-amp alternator, and vehicle battery 514 includes two 12-volt wet-cell batteries. Alternator 512 illustratively is driven by a chain 516 (FIG. 19) coupled to the crankshaft of engine 502. Vehicle 10 further includes a battery equalizer 628, such as a 24V/12V equalizer, coupled to batteries 514. Equalizer 628 is operative to draw substantially equal power from each battery 514 when powering vehicle components. In one embodiment, ECU 520 communicates over a controller area network (CAN) bus with other electronic components of vehicle 10. As illustrated in FIG. 19, a bilge pump 630 is provided at each corner of tub 40 for pumping water out of tub 40.

As illustrated in FIG. 13, a front axle assembly 532 includes a pair of drive axles 534 coupled to steering and drive assembly 508 for transferring torque from engine 502 to tracks 12, 14. Axles 534 are coupled to front drive units 590, 592 (FIG. 16) for driving left and right tracks 12, 14, respectively, in a front-wheel drive configuration. In an alternative embodiment, steering and drive assembly 508 is coupled to rear drive units of vehicle 10 to provide a rear-wheel drive configuration. A brake 536 is coupled to each axle 534 for providing a braking force to each axle 534 and drive unit 590, 592. Brakes 536 are actuated via a brake pedal provided in the operator area of vehicle 10. In the illustrated embodiment, brakes 536 are hydraulically controlled disc brakes. Brakes 536 are illustratively positioned outboard of tub 40. In one embodiment, the positioning of brakes 536 outside of tub 40 facilitates air-cooling of brakes 536.

A hydraulic pump assembly 518 is also coupled to engine 502 and is driven by the crankshaft of engine 502. As described herein, hydraulic pump assembly 518 is operative to drive hydraulic motor 552 of steering and drive assembly 508 to facilitate zero-speed turning and low-speed turning of vehicle 10. In one embodiment, hydraulic pump assembly 518 includes a dual hydraulic pump in a dual stage configuration, i.e., a pair of hydraulic pumps coupled in a series relationship (see FIG. 18, for example). Hydraulic lines are routed from hydraulic pump assembly 518 to hydraulic motor 552 of steering and drive assembly 508. In one embodiment, hydraulic pump assembly 518 drives other hydraulic components of vehicle 10.

In operation, to drive vehicle 10 straight forward, steering and drive assembly 508 applies power from engine 502 to both drive units 590, 592 (FIG. 16) such that both left and right tracks 12, 14 rotate at the same speed. To steer the vehicle 10 based on the steering angle of steering wheel 529 (FIG. 8), steering and drive assembly 508 applies a differential to the driving speeds of each drive unit 590, 592 (FIG. 16). The speed difference between the left and right drive units 590, 592 is different depending on the desired corner radius that vehicle 10 is driven.

In one embodiment, the differential speed of the two driving units 590, 592 is achieved by a controlled variation of the drive ratio between the two driving units 590, 592, and not by applying brakes 536. As such, the distribution of the torque applied to drive units 590, 592 is adjusted without changing the total torque applied. The torque reduced on the one side of vehicle 10 is applied to the other side of vehicle 10. Based on this behavior, the vehicle 10 keeps a constant driving speed during steering. In an alternative embodiment, brakes 536 are actuated to assist with steering vehicle 10.

Figure 15:
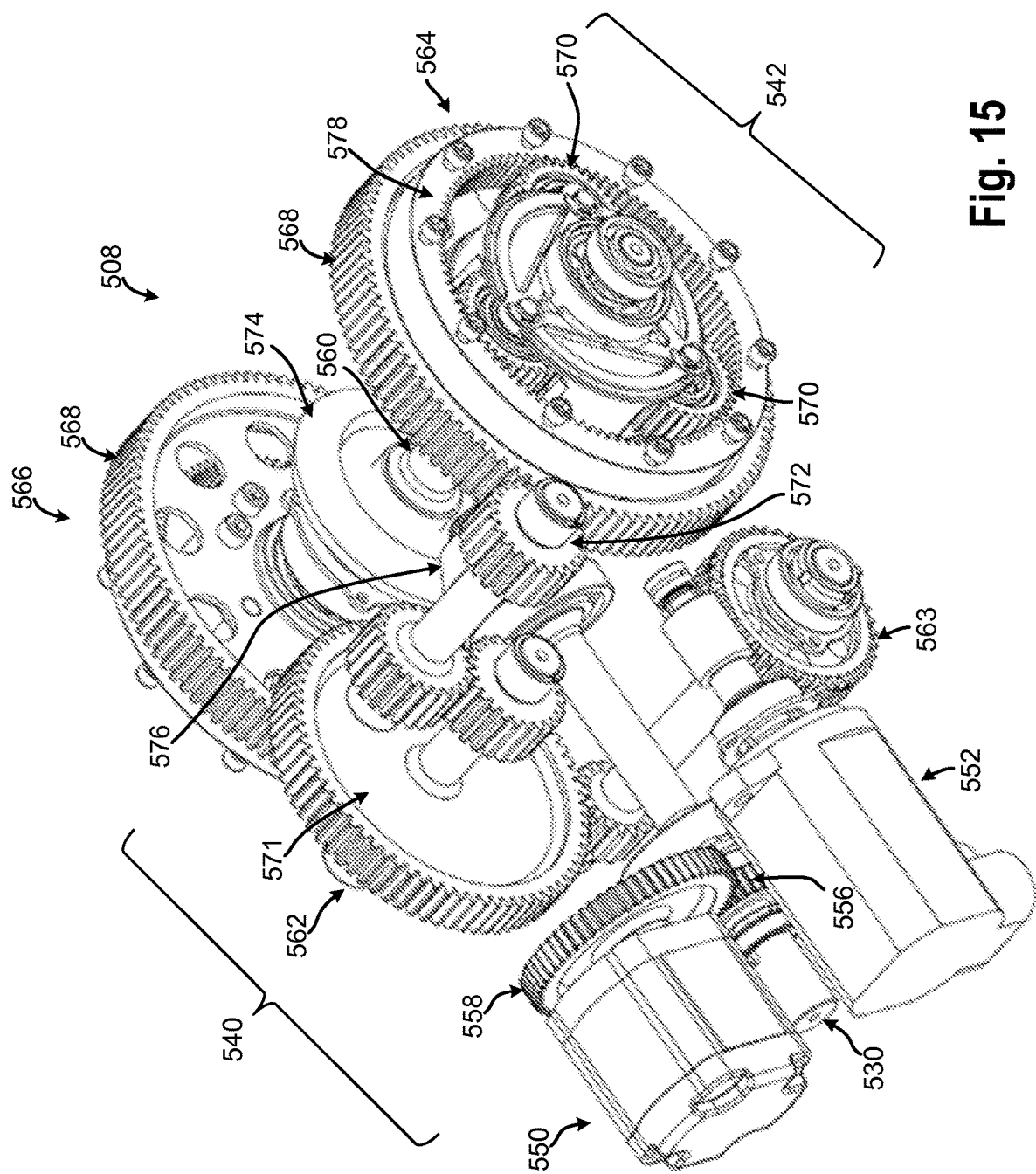
FIG. 15 is a perspective view of a steering and drive assembly of the powertrain system of FIG. 13 with an outer housing removed.

As illustrated in FIGS. 13-15, steering and drive assembly 508 includes a steering assembly 540 coupled to a drive assembly 542. Steering assembly 540 includes a hydraulic pump 550 driven by drive shaft 506, a hydraulic motor 552, and a steering gear assembly 562. In the illustrated embodiment, hydraulic pump 550 and hydraulic pump assembly 518 are provided on the same hydraulic circuit of vehicle 10 (see FIG. 18) and are operative to drive hydraulic motor 552. As described herein, the steering angle of steering wheel 529 controls a steering valve (FIG. 18) to control the rotation of hydraulic motor 552 and thus the steering input to steering gear assembly 562 and drive assembly 542.

As illustrated in FIG. 15, steering assembly 540 includes an input shaft 530 that couples to second portion 522 (FIG. 14) of drive shaft 506. Input shaft 530 is drivingly coupled to a shaft 560 of drive assembly 542 via interacting angled gears 574, 576. Drive assembly 542 includes a differential gearbox having right and left planetary gear assemblies 564, 566, respectively, driven by shaft 560. Each planetary gear assembly 564, 566 includes a sun gear 578 coupled at each end of shaft 560 to provide driving input to drive axles 534. Each planetary gear assembly 564, 566 further includes planetary gears 570 and a ring gear 568.

The steering angle of the steering input device, i.e., steering wheel 529 of FIG. 8, defines the differential speed of the two drive axles 534 and therefore the turning radius of vehicle 10 depending on the vehicle speed. A greater vehicle speed results in a greater turning radius for a same steering input. The steering input is directed from hydraulic steering motor 552 through the steering gear assembly 562 to the ring gear 568 of the planetary gear assemblies 564, 566. Steering gear assembly 562 includes a steering gear train comprising a gear shaft 563 coupled to the output of motor 552 and a gear shaft 571 coupled to gear shaft 563 for driving ring gear 568 of planetary gear assembly 566. Steering gear assembly 562 includes an intermediate gear shaft 572 coupled to gear shaft 571 for driving ring gear 568 of gear assembly 564.

When vehicle 10 is driving straight in the forward or reverse direction without steering input, the output of motor 552, steering gear assembly 562, and ring gear 568 are stationary, and drive axles 534 coupled to planetary gear assemblies 564, 566 rotate at the same speed. Depending on the steering angle of steering wheel 529, hydraulic motor 552 is driven faster or slower in one or the other direction based on the turning direction requested. The hydraulic motor 552 thus drives the ring gear 568 through the steering gear assembly 562. Rotation of the ring gear 568 changes the gear ratio of the planetary gear assembly 564, 566 and results in the differential speed of the two drive axles 534.

In one embodiment, to keep a constant velocity of vehicle 10 during a turning operation, the outer side drive axle 534 (relative to the turning direction) is driven faster than a neutral vehicle speed (i.e., the requested speed of the vehicle 10), and the inner side drive axle 534 is driven the same amount slower than the neutral vehicle speed. In the illustrated embodiment, intermediate shaft 572 of steering gear assembly 562 is operative to invert the rotational direction of the ring gear 568 of planetary gear assembly 564 relative to the rotational direction of ring gear 568 of planetary gear assembly 566. As such, the steering input provided with hydraulic motor 552 causes one drive axle 534 to drive faster and one drive axle 534 to drive slower relative to the neutral vehicle speed to provide the turning effect.

An operation of a drive assembly 542, hydraulic motor 552, and steering gear assembly 562 based on the steering input is detailed further in U.S. patent application Ser. No. 11/965,165, filed Dec. 27, 2007, titled "SKID STEERED ALL TERRAIN VEHICLE," the entire disclosure of which is incorporated by reference herein.

Figure 18:
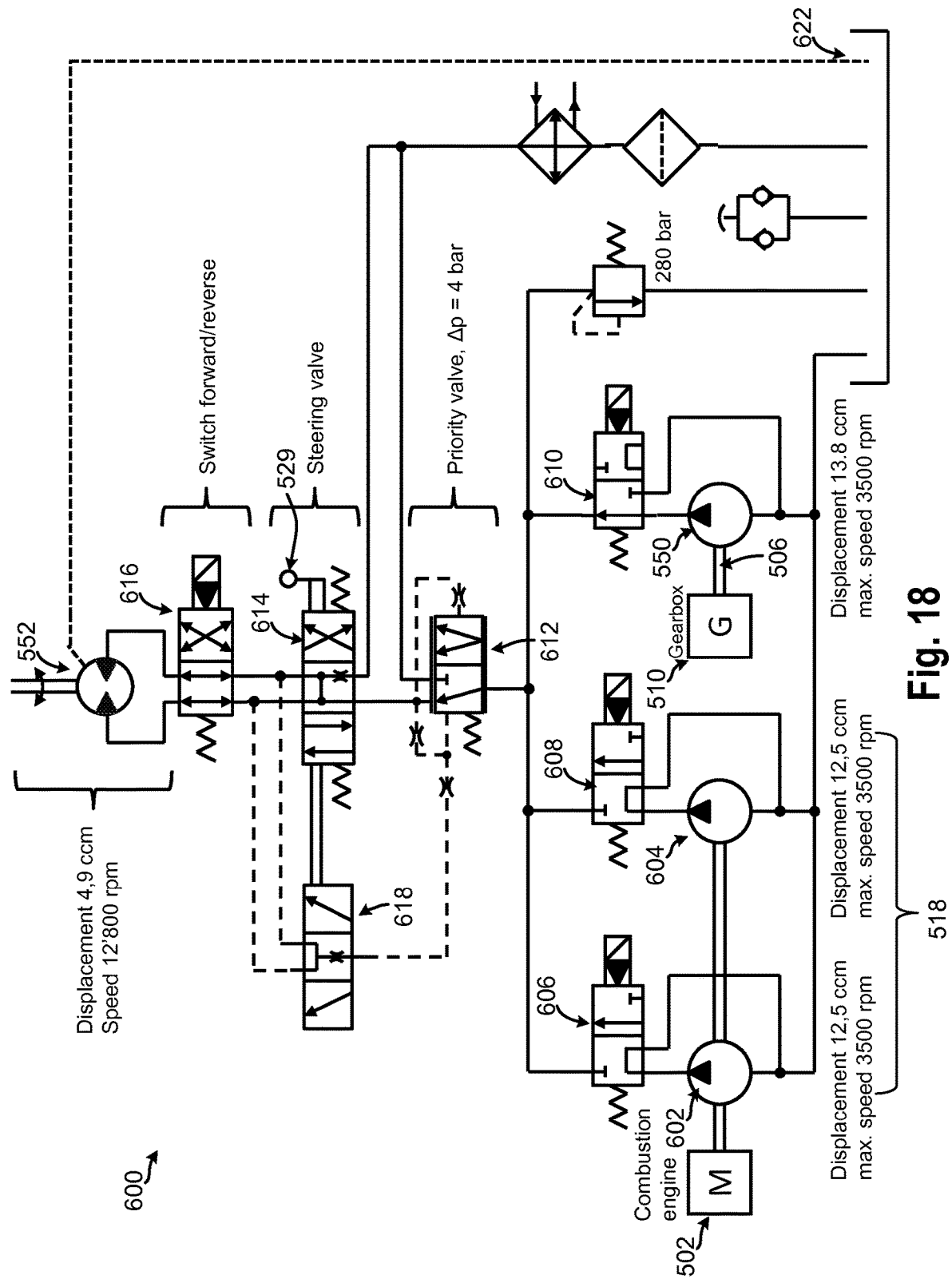
FIG. 18 is a diagrammatic view of a hydraulic steering system of the vehicle of FIG. 4.

Referring to FIG. 18, an exemplary hydraulic steering system 600 is illustrated. Engine 502 drives a first hydraulic pump 602 and a second hydraulic pump 604 of hydraulic pump assembly 518. A control valve 606, 608 is coupled at the output of each pump 602, 604, respectively. Gearbox 510 drives drive shaft 506 to drive hydraulic pump 550 of steering and drive assembly 508, and a control valve 610 is coupled at the output of pump 550. The hydraulic components of FIG. 18 are coupled together view hydraulic hoses or lines as illustrated. Exemplary pump displacements, pressure values, pump speeds, and other values are shown in FIG. 18 to illustrate an exemplary embodiment of hydraulic steering system 600, and other suitable values and specifications may be provided depending on system configuration.

A priority flow control valve 612 controls the flow volume from pumps 518, 550 to a steering valve 614 such that the pressure drop over the steering valve 614 is substantially constant. Steering wheel 529 is coupled to steering valve 614 and switching valve 618 to control the fluid flow to motor 552. Steering valve 614 serves as an adjustable orifice to control the amount of fluid flow to motor 552 and thus the amount of rotation of motor 552 and the amount of steering of vehicle 10. The flow direction to motor 552 is switched with switching valve 618 based on the direction that steering wheel 529 is turned. As such, steering valve 614 and switching valve 618 cooperate to control the direction and volume of fluid flow to hydraulic motor 552 to control the rotational direction of motor 552 based on steering wheel 529 being turned to the left or right (for a corresponding left or right vehicle turn). As such, the steering angle of steering wheel 529 is operative to control the volume and direction of flow to motor 552.

A hydraulic switch, illustratively switching valve 616 is provided between motor 552 and the output of steering valve 614 to further control the direction of flow to the hydraulic motor 552 based on the operating gear of vehicle 10. In particular, in a forward gear of gearbox 510, switching valve 616 controls the fluid flow to rotate motor 552 in one direction. In a reverse gear of gearbox 510, switching valve 616 is operative to reverse the flow direction to motor 552, thereby allowing the steering direction of vehicle 10 to be independent of the forward or reverse movement of vehicle 10 based on a same steering angle of steering wheel 529. Switching valve 616 may be controlled electrically or mechanically based on the selection of a forward or reverse gear of gearbox 510.

Hydraulic fluid which is not used for steering may be either used to drive any other working hydraulic units of vehicle 10 or returned over a return line to the oil reservoir 622. The operation of priority control valve 612, steering valve 614, switching valve 616, and switching valve 618 of FIG. 18 is detailed further in U.S. patent application Ser. No. 11/965,165, filed Dec. 27, 2007, titled "SKID STEERED ALL TERRAIN VEHICLE," the entire disclosure of which was previously incorporated by reference herein.

In one embodiment, steering wheel 529 includes a position sensor 640 (FIGS. 20-21) in communication with ECU 520 (or another vehicle controller) for detecting a steering angle of steering wheel 529. In this embodiment, based on the detected steering angle, ECU 520 routes a control signal to steering valve 614 and switching valve 616. Steering wheel 529 may alternatively be mechanically or hydraulically coupled to steering valve 614 and switching valve 616.

Hydraulic pump 550 and hydraulic pump assembly 518 are operative to drive hydraulic motor 552 based on the operating condition of vehicle 10. In the illustrated embodiment, hydraulic pump 550 drives motor 552 for steering operations when vehicle is moving. In particular, hydraulic pump 550 is driven by drive shaft 506 via gears 556, 558 (FIG. 15). As such, movement of vehicle 10 across the ground causes drive shaft 506 to rotate to thereby drive pump 550. Thus, hydraulic pump 550 provides power to hydraulic motor 552 when pump 550 is driven by drive shaft 506.

In the illustrated embodiment, when engine 502 is disabled, but tracks 12, 14 are moving to rotate drive shaft 506, hydraulic pump 550 is operative to drive motor 552 to provide vehicle steering. Such a configuration may serve as a control feature for steering vehicle 10 when vehicle 10 is not powered but is coasting or moving down a hill, for example. In the illustrated embodiment, pump 550 is mechanically coupled to drive shaft 506 such that pump 550 rotates when drive shaft 506 rotates. In the illustrated embodiment, both forward and reverse movement of vehicle 10 is operative to drive pump 550 to power motor 552.

Hydraulic pump assembly 518 is operative to drive motor 552 to turn vehicle 10 when vehicle 10 is stopped or below a minimal threshold speed (e.g., 5 mph, 3 mph, etc.) or when ECU 520 determines that additional hydraulic power is required to drive hydraulic motor 552. Hydraulic pump 518, driven by engine 502, provides hydraulic power to motor 552 such that vehicle 10 is operative to turn when at a zero vehicle speed based on an operator turning steering wheel 529 and without operator input to the vehicle accelerator. As such, in one embodiment, hydraulic pump assembly 518 is operative to drive motor 552 for small radius turns, including a zero radius turn, and hydraulic pump 550 is operative to drive motor 552 for larger radius turns (i.e., when tracks 12, 14 are moving).

In one embodiment, vehicle 10 must be traveling at a speed less than a threshold vehicle speed before hydraulic pump assembly 518 is actuated by ECU 520 to drive motor 552. For example, vehicle 10 includes a speed sensor 642 (FIGS. 20-21) operative to detect a speed of tracks 12, 14 and/or drive shaft 506. Upon the detected speed decreasing to below the speed threshold, ECU 520 activates hydraulic pump assembly 518 to drive hydraulic motor 552. In one embodiment, ECU 520 or another suitable controller controls the activation of hydraulic pump assembly 518 based on the vehicle speed and/or other inputs. In one embodiment, zero-radius turning is activated by ECU 520 when gearbox 510 is in a neutral operating gear, although it may be activated in other operating gears (e.g., reverse or forward). In one embodiment, ECU 520 further controls hydraulic pump assembly 518 to assist with steering when hydraulic pump 550 provides inadequate power to motor 552 (e.g., low vehicle speeds).

For example, referring to FIG. 16, an exemplary right turn steering operation is illustrated as controlled by hydraulic pump 550 for when tracks 12, 14 are moving. Due to the movement of vehicle 10 and thus the rotation of drive shaft 506, hydraulic pump 550 provides hydraulic power to rotate motor 552. Based on the steering angle of steering wheel 529, hydraulic motor 552 provides steering input to steering gear assembly 562 to cause a differential speed between drive units 590, 592, as described herein. In FIG. 16, drive unit 592 is driven slower than the neutral vehicle speed, and drive unit 590 is driven faster than the neutral vehicle speed to cause the vehicle to turn right.

Figure 17:
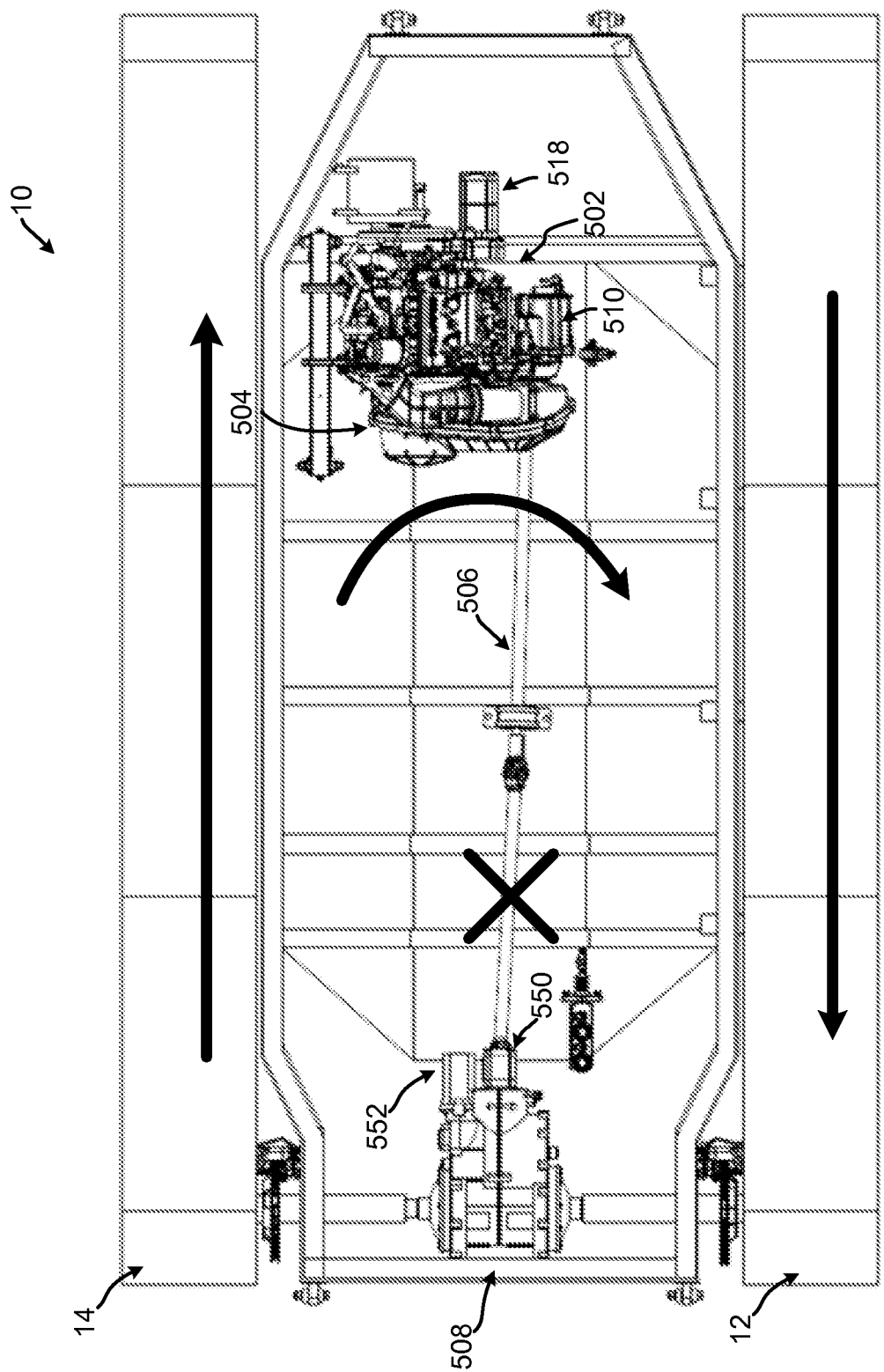
FIG. 17 is a top perspective view of the vehicle of FIG. 4 illustrating a zero-speed turning operation.

Referring to FIG. 17, an exemplary zero radius steering operation is illustrated as controlled by hydraulic pump assembly 518 for when vehicle 10 is stationary. With drive shaft 506 not rotating, hydraulic pump 550 does not provide hydraulic input to motor 552. Rather, engine 502 drives hydraulic pump assembly 518 to power motor 552 when vehicle 10 is stationary. Based on the steering angle of steering wheel 529, hydraulic motor 552 provides steering input to steering gear assembly 562 to cause a differential speed between drive units 590, 592 such that vehicle 10 turns at a zero radius or a minimal radius. In FIG. 17, tracks 12, 14 are driven at the same speed but in opposite directions to cause vehicle 10 to turn at the zero radius.

In one embodiment, the steering system described herein is operative to control vehicle 10 at low to high vehicle speeds, including speeds up to and over 60 mph, for example. Vehicle 10 includes an accelerator pedal including a position sensor 650 (FIG. 23) in communication with ECU 520 for providing a throttle request to engine 502.

In one embodiment, ECU 520 (FIGS. 20-23) is operative to enable and disable the zero-speed steering functionality provided with hydraulic pump assembly 518 based on the detection of an operator in seat 22. Seat 22 includes a seat switch or sensor 652 (FIG. 21) for detecting the presence of an operator, as detailed further in U.S. patent application Ser. No. 13/650,697, filed on Sep. 4, 2012, the entire disclosure of which is incorporated by reference herein. ECU 520 enables operation of hydraulic pump assembly 518 to enable zero-speed turning upon detection of an operator in seat 22 and disables operation of hydraulic pump assembly 518 when an operator is not detected in seat 22. In one embodiment, ECU 520 is further operative to enable and disable power to the attachment via attachment shaft 511 based on detection of an operator in operator seat 22. In this embodiment, when an operator is not detected at seat 22, ECU 520 disengages attachment shaft 511 to stop and/or to prevent the delivery of power from engine 502 to the attachment. As such, engine 502 may be controlled to provide power to the attachment when an operator is seated and not when an operator is off the seat. In one embodiment, ECU 520 delays deactivating hydraulic pump assembly 518 after detecting seat 22 is in an unoccupied state for a predetermined time lapse, such as for one second or any other suitable time lapse.

ECU 520 includes at least one processor that executes software and/or firmware stored in memory of ECU 520. The software/firmware contains instructions that, when executed by the processor, causes ECU 520 to perform the functions described herein. ECU 520 may alternatively include one or more application-specific integrated circuits (ASICs), field-programmable gate arrays (FPGAs), digital signal processors (DSPs), hardwired logic, or combinations thereof. In one embodiment, the processor of ECU 520 includes both engine control logic operative to control engine 502 and CVT control logic operative to control CVT 504. ECU 520 may alternatively include multiple control units or processors functioning together to perform the functions of ECU 520 described herein.

Referring to FIG. 20, ECU 520 is operative to provide torque compensation during a steering event. Due to the hydraulic system using some engine power to steer vehicle 10 and/or to power other components of vehicle 10, ECU 520 controls engine 502 to deliver additional torque when engine 502 power is being consumed by the hydraulic system. As such, the likelihood of stable vehicle speed is increased without any corrections made by the operator (e.g., further actuation of accelerator). ECU 520 receives as sensor inputs the hydraulic pressure on steering valve 614 (FIG. 18) from a hydraulic pressure sensor 644, the vehicle speed (e.g., the rotational speed of input shaft 530 (FIG. 15) or drive shaft 506) from speed sensor 642, the steering angle of steering wheel 529 (FIG. 8) from steering angle sensor 640, and the selected operating gear of sub-transmission gearbox 510 (e.g., high, low, reverse, neutral, park) from a gear selector 646. Based on these inputs, ECU 520 automatically adjusts the speed of engine 502 by controlling the throttle valve to compensate for the torque consumed by the hydraulic system to power the steering assembly or other hydraulic components. Additional detail for engine torque compensation is provided in U.S. patent application Ser. No. 11/965,165, filed Dec. 27, 2007, titled "SKID STEERED ALL TERRAIN VEHICLE," the entire disclosure of which was previously incorporated by reference herein.

Figure 21:
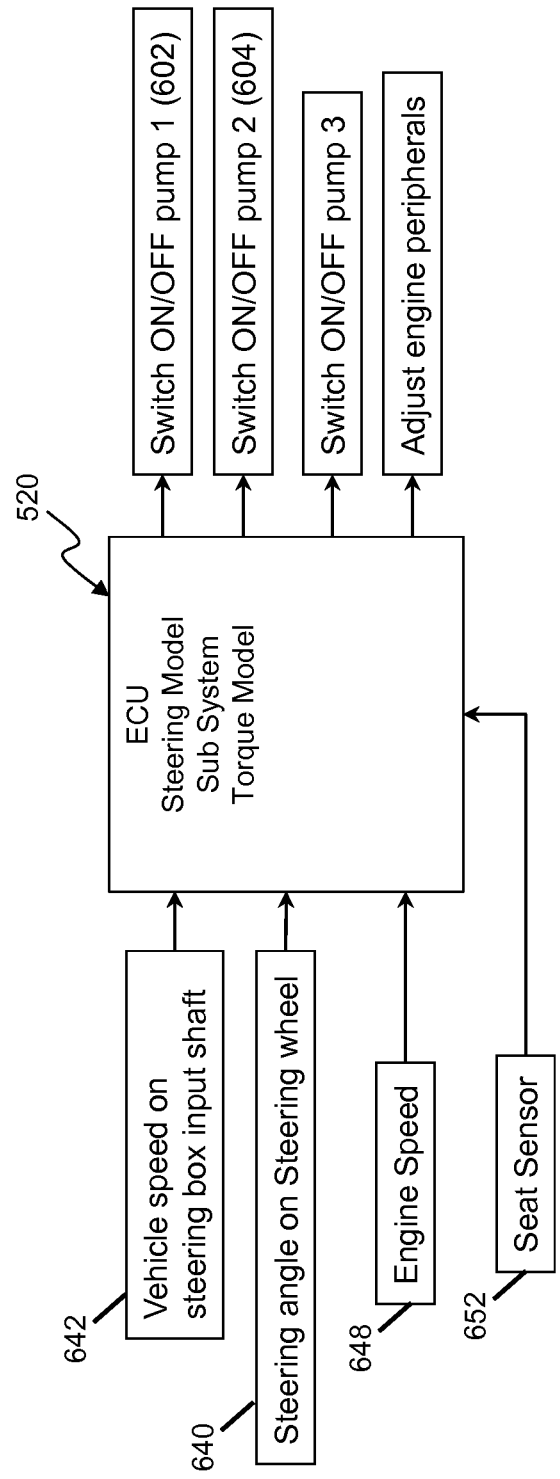
FIG. 21 is a block diagram illustrating a hydraulic pump control function of the engine control unit.

Referring to FIG. 21, ECU 520 is operative to control the activation of hydraulic pumps (e.g., pumps 602, 604 of FIG. 18) of hydraulic pump assembly 518. Based on the detected vehicle speed from speed sensor 642, the detected steering angle of steering wheel 529 from sensor 640, and the detected engine speed from an engine speed sensor 648, ECU 520 is operative to selectively active pumps 602, 604 of hydraulic pump assembly 518. As described herein, ECU 520 activates one or more pumps of hydraulic pump assembly 518 based on the vehicle speed decreasing to below the threshold speed. As such, hydraulic pump assembly 518 is used to drive hydraulic motor 552 of steering and drive assembly 508 (FIG. 15) at low or zero vehicle speeds, as described herein. ECU 520 monitors the vehicle speed and steering angle to determine if pump assembly 518 requires activation at speeds greater than the threshold, such as if additional steering power is required. In one embodiment, ECU 520 monitors the engine speed and increases the engine speed upon determining, based on the steering demand, vehicle speed, and engine speed, that additional power is required for driving the pumps of hydraulic pump assembly 518. In one embodiment, hydraulic pump assembly 518 includes at least two hydraulic pumps coupled in series. FIG. 21 illustrates hydraulic pump assembly 518 having three pumps in series. In one embodiment, when an operator is not detected in seat 22 based on output from seat sensor 652, ECU 520 disables operation of hydraulic pump assembly 518, as described herein.

Figure 22:
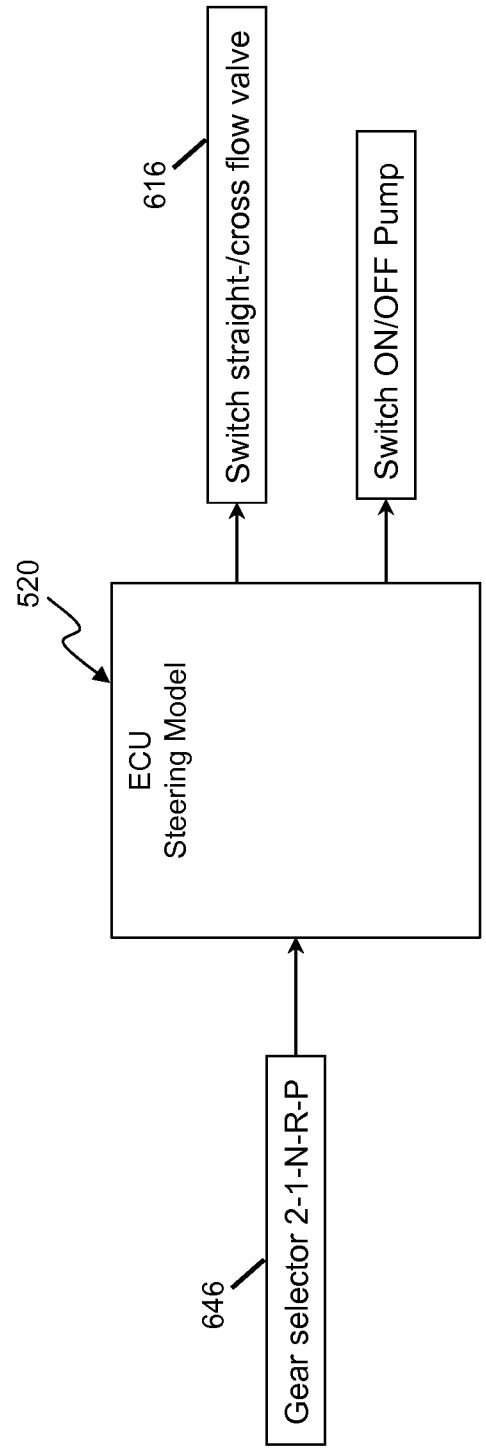
FIG. 22 is a block diagram illustrating a forward/reverse drive function of the engine control unit.

Referring to FIG. 22, ECU 520 is operative to control the forward and reverse drive of vehicle 10 based on a signal from a gear selector 646 (e.g., shift lever, buttons, or other suitable operator input device) and/or a signal from gearbox 510. Upon detecting a forward gear, ECU 520 controls switching valve 616 (FIG. 18) to rotate motor 552 in a first direction such that vehicle 10 turns in a direction corresponding to the direction demanded with steering wheel 529. Upon detecting a reverse gear, ECU 520 controls switching valve 616 to switch the flow direction to motor 552 to thereby reverse the direction of motor 552. As such, vehicle 10 turns in a direction corresponding to the direction demanded with steering wheel 529 when vehicle 10 is moving in reverse.

Figure 23:
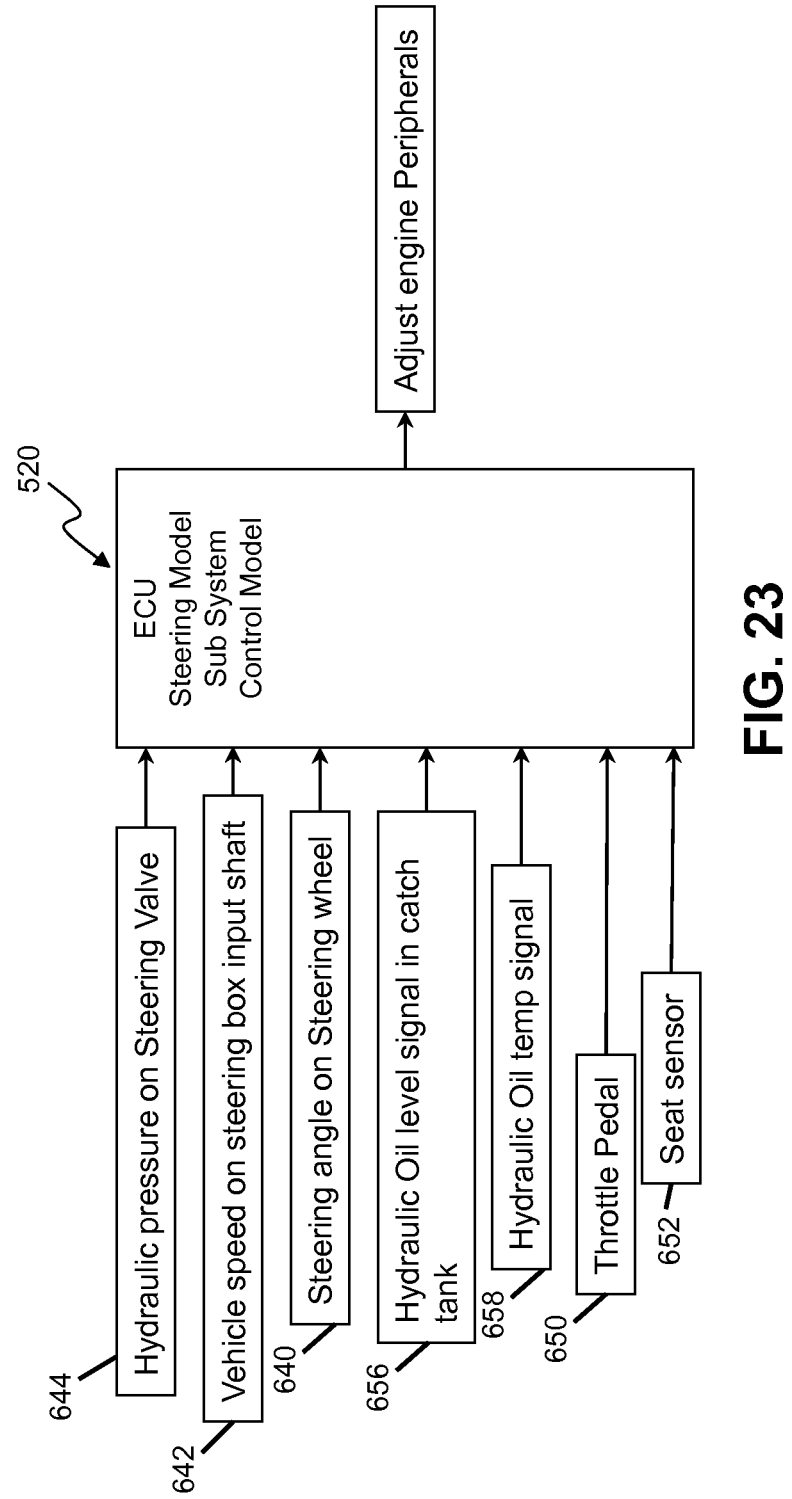
FIG. 23 is a block diagram illustrating safety functions of the engine control unit.

FIG. 23 illustrates several inputs that ECU 520 uses to control engine 502 and components coupled to engine 502 (e.g., hydraulic pump assembly 518, attachment shaft 511, etc.) to provide control functionality to vehicle 10. ECU 520 receives sensor inputs corresponding to the hydraulic pressure on steering valve 614 (FIG. 18) from hydraulic pressure sensor 644, the vehicle speed from sensor 642, the steering angle of steering wheel 529 from sensor 640, the hydraulic oil level in reservoir 622 (FIG. 18) from a hydraulic level sensor 656, the hydraulic oil temperature from a temperature sensor 658, the throttle pedal position (throttle demand) from accelerator position sensor 650, and the occupied or unoccupied state of seat 22 from seat sensor 652. As described herein, ECU 520 implements various control features based on the signals. For example, ECU 520 disables the zero-speed turning feature upon an operator not being detected in seat 22. In one embodiment, the disabling of the zero-speed turning feature is in response to a detected unoccupied state of the seat 22, no or minimal throttle demand being detected, and no or minimal vehicle speed being detected by ECU 520. ECU 520 further disables components of the hydraulic circuit and/or reduces vehicle speed based on a low oil level, a high oil temperature, or a low/high oil pressure detection.

Figure 24:
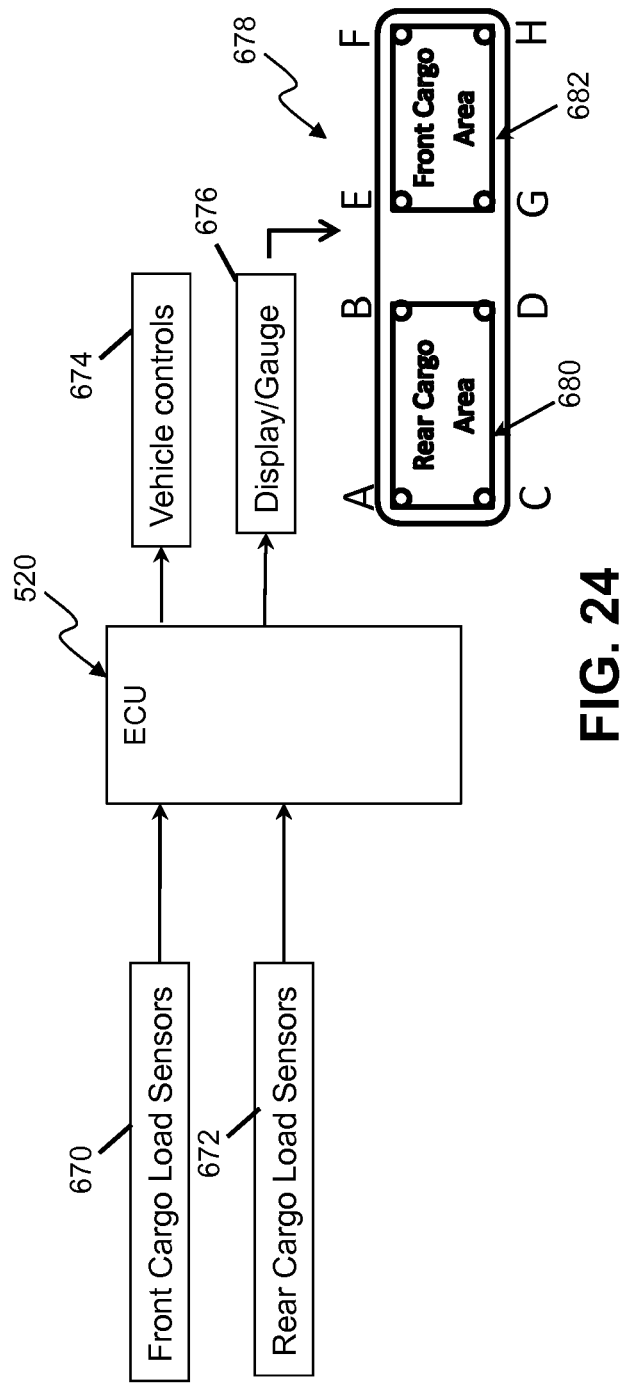
FIG. 24 is a block diagram illustrating a load level notification system provided with the engine control unit.

Referring to FIG. 24, ECU 520 is further operative to detect and to notify the operator of a payload distribution of vehicle 10. For example, the distribution of payload (e.g., cargo, operator, other loads) may affect the stability of vehicle 10 more when vehicle 10 is in buoyancy mode in water than when vehicle 10 is on dry land. If vehicle 10 has been loaded unevenly, vehicle operation may become unstable upon vehicle 10 transitioning into water. ECU 520 is operative to provide an indication to the operator via a signal to a gauge 676 of an optimal or recommended distribution of the payload.

Vehicle 10 includes a network of load sensors in communication with ECU 520, illustratively load sensors 670 mounted in the front cargo area 26 and load sensors 672 mounted in the rear cargo area 28. Additional load sensors may be provided in other areas of vehicle 10. Load sensors 670, 672 may include weight or pressure sensors or other suitable sensors for detecting a load and providing a signal representative of the detected load to ECU 520. In one embodiment, load sensors 670, 672 are integrated into mounting bolts that are coupled to a respective structure (e.g., floor panel) of front and rear cargo areas 26, 28. Other suitable weight or pressure sensor apparatuses fit for the environment and necessary output levels may be provided.

The output of sensors 670, 672 are read by ECU 520 to determine the weight or pressure at each location of sensors 670, 672. Based on the readings, ECU 520 determines the load differential between the different sensor mounting locations to determine the payload distribution of vehicle 10. ECU 520 communicates the status of the payload distribution to a display or gauge 676 to notify the operator of the payload distribution and to alert the operator when weight differentials exceed threshold limits. If the threshold limits are exceeded, ECU 520 alerts the operator that the payload should be shifted to obtain improved vehicle stability. ECU 520 may also notify the operator when a maximum total vehicle payload has been exceeded, or a maximum rear or front total payload has been exceeded. In one embodiment, the threshold limits may be calibrated. In one embodiment, ECU 520 may implement or modify vehicle controls when the payload threshold limits are exceeded. For example, ECU 520 may limit the maximum speed or maximum torque of the engine via electronic throttle control, or other suitable control measures may be taken by ECU 520. ECU 520 may also sound an audible alarm when the limits are exceeded.

An exemplary gauge 676 is illustrated with gauge 678 of FIG. 24. Gauge 678 provides a graphical representation of vehicle 10, including a top-down representation 680 of rear cargo area 28 and a top-down representation 682 of front cargo area 26 of vehicle 10 within an outline of the outer perimeter of vehicle 10. Representations 680, 682 may include a picture or other rendering coupled to dashboard 25 (FIG. 6) or may include graphical data displayed by ECU 520 on a display screen. Multiple indicators A through H are provided in representations 680, 682 to represent the physical locations of the sensors 670, 672 on vehicle 10. For example, indicators A, B, C, and D are at the corners of representation 680 to represent sensors 672 mounted at the corners of rear cargo area 28, and indicators E, F, G, and H are at the corners of representation 682 to represent sensors 670 mounted at the corners of front cargo area 26. Sensors 670, 672 may be mounted at other suitable locations of cargo areas 26, 28. In one embodiment, indicators A through H are illuminated with different colors to indicate the sensor status and therefore the payload status. Indicators A-H may include light emitting diodes (LEDs), graphical data provided on a display screen, or other suitable devices controlled by ECU 520 for indicating the sensor status.

For example, an individual indicator is illuminated green indicates the load point is "acceptable", solid amber indicates the load point is "cautionary" and too light compared to another load point, flashing amber indicates the load point is "highly cautionary" and too light compared to another load point, solid red indicates the load point is "cautionary" and too heavy compared to another load point, and flashing red indicates the load point is "highly cautionary" and too heavy compared to another load point. Further, all indicators are illuminated red as "cautionary" when a first recommended total payload limit of vehicle 10 is exceeded and flashing red as "highly cautionary" when a second (higher) recommended payload limit of vehicle 10 is exceeded. Other colors and behavior of indicators may be implemented to indicate load status.

The following table provides examples of key sensor mounting location relationships with reference to gauge 678:

TABLE 1

Key Sensor Mounting Location Relationships

| VEHICLE REAR | VEHICLE FRONT | TOTAL VEHICLE |
|---|---|---|
| A-B | E-F | A-F |
| A-C | E-G | A-H |
| A-D | E-H | C-F |
| B-C | F-G | C-H |
| B-D | F-H | |
| C-D | G-H | |

As illustrated in Table 1, gauge 678 may be used to monitor the loads between different combinations of sensor mounting locations to thereby determine payload differentials between mounting locations or regions at the rear portion of vehicle 10, the front portion of vehicle 10, and the overall vehicle 10. ECU 520 may provide calibratable limits for each location differential to set load differential at which the payload distribution transitions from acceptable to cautionary to highly cautionary. For example, ECU 520 may broadcast the status of each sensor 670, 672 via indicators A-H as follows:

TABLE 2

Load Sensor Status (A-H)
WEIGHT/PRESSURE SENSOR STATUS (A-H)

| STATES | DESCRIPTION | POSSIBLE INDICATOR STATUS |
|---|---|---|
| 000 | Acceptable Differentials | Indicator Solid Green |
| 001 | Cautionary (Differential indicates this needs MORE weight) | Indicator Solid Amber |
| 010 | Highly Cautionary (Differential indicates this needs MORE weight) | Indicator Flashing Amber |
| 011 | Cautionary (Differential indicates this needs LESS weight) | Indicator Solid Red |
| 100 | Highly Cautionary (Differential indicates this needs LESS weight) | Indicator Flashing Red |
| 110 | Error | Indicator Flashes Alternating Red and Amber |
| 111 | Not Available | Indicator Flashes Alternating Red and Amber | wherein each state is illustratively represented by a three-bit code. As shown in Table 2, each indicator A-H may be illuminated with a different color to indicate the load status. In the illustrated embodiment, solid green indicates an acceptable status, solid amber and solid red each indicate cautionary status (more or less weight needed at location, respectively), flashing amber and flashing red indicates highly cautionary status (more or less weight needed at location, respectively), and alternating flashing red and amber indicates an error with the load detection system or that load information is not available.

ECU 520 may also implement calibratable limits for indicating when the total vehicle payload transitions from acceptable to cautionary to highly cautionary. This may be indicated with a separate gauge or with gauge 678. For example, to provide this indication with gauge 678, the following status indicators may be provided:

TABLE 3

Total Payload Status
TOTAL PAYLOAD STATUS

| STATES | DESCRIPTION | POSSIBLE INDICATOR STATUS |
|---|---|---|
| 000 | Acceptable Differentials | Defaults to Current Weight/Pressure Sensor Status |
| 001 | Cautionary (First Payload Calibration Limit Exceeded, but Below Next Limit) | Indicators All Solid Red |
| 010 | Highly Cautionary (Next Payload Calibration Limit Exceeded) | Indicators All Flashing Red |
| 110 | Error | Indicator Flashes Alternating Red and Amber |
| 111 | Not Available | Indicator Flashes Alternating Red and Amber |

For example, when the total vehicle payload is acceptable, the indicators A-H default to the current individual load sensor statuses described above with Table 2. Indicators A-H are all solid red to indicate a cautionary status when a first total payload limit has been exceeded. Indicators A-H are all flashing red to indicate a highly cautionary status when a second, higher total payload limit has been exceeded. Indicators A-H alternately flash red and amber to indicate an error with load detection system or load information not available.

In one embodiment, the calibratable threshold limits for the payload at each individual sensor and the overall payload may be pre-determined based on real-world data collection and/or stability simulation.

As one example, if indicators F and H of gauge 678 of FIG. 24 are solid red, indicators E and G are solid amber, and indicators A, B, C, and D are all solid green, gauge 678 indicates to an operator that cargo in the front cargo area 26 of vehicle 10 should be shifted towards the center of vehicle 10. Once the appropriate amount of weight has been shifted towards the center of vehicle 10, indicators E, F, G, and H all turn green when the payload balance is acceptable.

Figure 25:
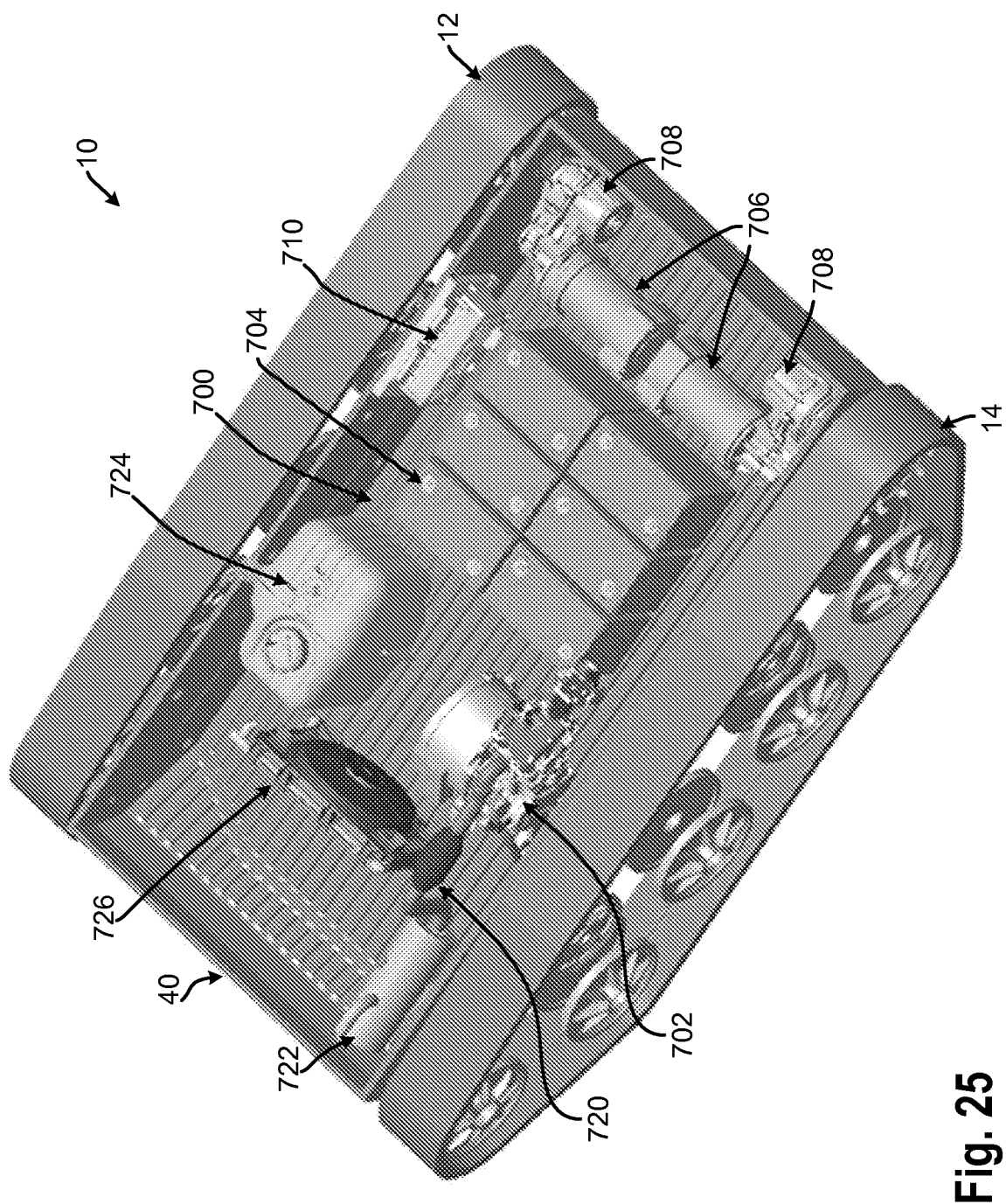
FIG. 25 is a front right perspective view of the vehicle of FIG. 4 according to an embodiment having a series hybrid drive configuration.

In an alternative embodiment, vehicle 10 includes a series hybrid drive configuration as illustrated in FIG. 25. Referring to FIG. 25, a hybrid electric drive system 700 of exemplary vehicle 10 includes a gas engine generator 702, a bank of batteries 704 charged by generator 702, an inverter 710, and a pair of electric motors 706 configured to drive tracks 12, 14. Each electric motor 706 drives tracks 12, 14 via a gear reduction box 708 coupled to the corresponding drive unit 590, 592. In one embodiment, disk brakes are coupled off gear boxes 708 either inboard or outboard of tub 40. Vehicle 10 of FIG. 27 further includes a catalytic converter 720 and an exhaust silencer 722 coupled to the exhaust of engine 702. A fuel tank 724 and a radiator and fan 726 are positioned inboard of tub 40.

In operation, the gas engine 702 serves as a generator to supply electric power to inverter 710, which charges batteries 704. Independent operation of electric motors 706 may be commanded electronically via drive-by-wire from the ECU to provide the speed/torque differential between tracks 12, 14 for turning vehicle 10. Electric motors 706 may also be counter rotated at low ground speeds to provide a zero-radius turn. When batteries 704 require additional power to drive tracks 12, 14, engine 702 is commanded to run to charge batteries 704 until batteries 704 have sufficient power and engine 702 is shut down. The series hybrid drive configuration is further detailed in U.S. patent application Ser. No. 13/441,537, filed Apr. 6, 2012, titled "ELECTRIC VEHICLE WITH RANGE EXTENDER," the entire disclosure of which is incorporated by reference herein In one embodiment, vehicle 10 is adapted to be remotely controlled. For example, a remote control electronic device may be used to control vehicle 10 wirelessly without an operator being positioned in the vehicle 10. In one embodiment, vehicle 10 is operative to drive autonomously without human input.

The entire disclosure of U.S. patent application Ser. No. 11/035,925, filed Jan. 14, 2005, titled "TRACKED ATV," is incorporated by reference herein.

The term "logic" or "control logic" as used herein may include software and/or firmware executing on one or more programmable processors, application-specific integrated circuits (ASICs), field-programmable gate arrays (FPGAs), digital signal processors (DSPs), hardwired logic, or combinations thereof. Therefore, in accordance with the embodiments, various logic may be implemented in any appropriate fashion and would remain in accordance with the embodiments herein disclosed.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A vehicle comprising:
a plurality of ground engaging members, the plurality of ground engaging members including a track having a lower portion configured to engage a ground surface, an upper portion vertically spaced from the lower portion, a forward portion extending between the lower portion and the upper portion, an ultimate forward longitudinal end and an ultimate rearward longitudinal end;
a frame supported by the plurality of ground engaging members;
a suspension assembly positioned within an interior of the track;
a seat for an operator supported by the frame, the seat having a rearward end between the ultimate forward longitudinal end and the ultimate rearward longitudinal end of the track;
a steering input configured to rotate, the steering input supported by the frame and positioned forward of and laterally aligned with the seat;
a drive unit rotatable about a drive unit rotational axis and extending within the interior of the track and profiled to engage only the upper portion and the forward portion of the track;
a plurality of batteries supported by the plurality of ground engaging members, the plurality of batteries including a first battery positioned:
longitudinally rearward of the ultimate forward longitudinal end of the track,
longitudinally forward of the ultimate rearward longitudinal end of the track, and
outside of the interior of the track; and
an electric motor rotatable about an electric motor rotational axis and operatively coupled to plurality of batteries and operatively coupled to the drive unit to power movement of the track, the electric motor positioned longitudinally forward of the first battery of the plurality of batteries and the electric motor rotational axis of the electric motor is longitudinally offset relative to the drive unit rotational axis of the drive unit.

2. The vehicle of claim 1, further comprising a gear reduction box operatively coupled to the electric motor and operatively coupled to the drive unit, the electric motor driving the drive unit through the gear reduction box.

3. The vehicle of claim 1, wherein the first battery is longitudinally offset relative to the drive unit.

4. The vehicle of claim 1, wherein the track has a lateral width and the electric motor has a first end positioned laterally offset from the track.

5. The vehicle of claim 1, wherein the plurality of batteries includes a second battery positioned:
longitudinally rearward of the ultimate forward longitudinal end of the track,
longitudinally forward of the ultimate rearward longitudinal end of the track,
longitudinally rearward of the electric motor, and
outside of the interior of the track.

6. The vehicle of claim 5, wherein the second battery is longitudinally offset relative to the first battery.

7. The vehicle of claim 6, wherein the second battery is further laterally offset relative to the first battery.

8. The vehicle of claim 5, wherein the second battery is laterally offset relative to the first battery.

9. The vehicle of claim 1, wherein each of the plurality of batteries is positioned:
rearward of the ultimate forward longitudinal end of the track,
forward of the ultimate rearward longitudinal end of the track, and outside of the interior of the track.

10. The vehicle of claim 1, wherein the drive unit is drivable by the electric motor in both a first direction and a second direction, the second direction being opposite the first direction.

11. The vehicle of claim 1, wherein the plurality of ground engagement members includes a second track.

12. The vehicle of claim 11, wherein the second track is longitudinally aligned with the track and laterally offset from the track.

13. The vehicle of claim 12, further comprising a second electric motor operatively coupled to the plurality of batteries, the second electric motor operatively coupled to the second track to power movement of the second track.

14. The vehicle of claim 1, wherein the frame includes a protective portion extending below the first battery of the plurality of batteries and separating the first battery of the plurality of batteries from the track.

15. The vehicle of claim 14, wherein the protective portion is a tub and the first battery of the plurality of batteries is received within the tub.

16. The vehicle of claim 14, wherein the protective portion has a generally U-shaped profile in a lateral direction.

17. The vehicle of claim 16, wherein protective portion includes a front wall positioned longitudinally forward of the drive unit.

18. The vehicle of claim 1, wherein the suspension assembly includes
a plurality of laterally extending shafts positioned within the interior of the track;
a plurality of control arms positioned within the interior of the track and moveably coupled to the plurality of laterally extending shafts; and
a plurality of carrier rollers positioned within the interior of the track, the plurality of carrier rollers being coupled to the plurality of shafts and plurality of control arms.

19. The vehicle of claim 1, wherein the suspension assembly includes
a longitudinally extending carriage positioned within the interior of the track;
a plurality of control arms positioned within the interior of the track and moveable relative to the carriage;
a shock absorber positioned within the interior of the track and moveably coupled to a first control arm of the plurality of control arms; and
a plurality of carrier rollers positioned within the interior of the track, wherein the carriage, the plurality of control arms, and the shock absorber cooperating to position the plurality of carrier rollers.

20. The vehicle of claim 1, further comprising a radiator longitudinally offset from the first battery.

21. The vehicle of claim 1, wherein the track is propelled only by the electric motor.

22. A vehicle comprising:
a plurality of ground engaging members, the plurality of ground engaging members including a track having a lower portion configured to engage a ground surface, an upper portion vertically spaced from the lower portion, a forward portion extending between the lower portion and the upper portion, an ultimate forward longitudinal end and an ultimate rearward longitudinal end;
a frame supported by the plurality of ground engaging members;
a suspension assembly positioned within an interior of the track;
a seat for an operator supported by the frame, the seat having a rearward end between the ultimate forward longitudinal end and the ultimate rearward longitudinal end of the track;
a steering input configured to rotate, the steering input supported by the frame and positioned forward of and laterally aligned with the seat;
a drive unit rotatable about a drive unit rotational axis and extending within the interior of the track and profiled to engage only the upper portion and the forward portion of the track;
a plurality of batteries supported by the plurality of ground engaging members, the plurality of batteries including a first battery positioned outside of the interior of the track;
an inverter operably coupled to the batteries, the inverter positioned:
longitudinally rearward of the ultimate forward longitudinal end of the track,
longitudinally forward of the ultimate rearward longitudinal end of the track, and
outside of the interior of the track; and
an electric motor rotatable about an electric motor rotational axis and operatively coupled to plurality of batteries and operatively coupled to the drive unit to power movement of the track, the electric motor positioned longitudinally forward of the first battery of the plurality of batteries and the electric motor rotational axis of the electric motor is longitudinally offset relative to the drive unit rotational axis of the drive unit.

23. The vehicle of claim 22, wherein the inverter is positioned longitudinally aligned with the first battery.

24. The vehicle of claim 22, wherein the steering input is positioned independent of the seat.

* * * * *